United States Patent
Kawahira et al.

(10) Patent No.: US 11,927,850 B2
(45) Date of Patent: Mar. 12, 2024

(54) LIQUID CRYSTAL DISPLAY DEVICE

(71) Applicant: Sharp Display Technology Corporation, Kameyama (JP)

(72) Inventors: Yuichi Kawahira, Kameyama (JP); Masahiro Hasegawa, Kameyama (JP); Ryosuke Saigusa, Kameyama (JP); Akira Sakai, Kameyama (JP)

(73) Assignee: Sharp Display Technology Corporation, Kameyama (JP)

( * ) Notice: Subject to any disclaimer, the term of this patent is extended or adjusted under 35 U.S.C. 154(b) by 0 days.

(21) Appl. No.: 18/195,917

(22) Filed: May 10, 2023

(65) Prior Publication Data

US 2023/0367156 A1 Nov. 16, 2023

(30) Foreign Application Priority Data

May 16, 2022 (JP) ................. 2022-080241

(51) Int. Cl.
*G02F 1/13363* (2006.01)
*G02B 27/01* (2006.01)
*G02F 1/1335* (2006.01)
*G06F 1/16* (2006.01)

(52) U.S. Cl.
CPC ... *G02F 1/133634* (2013.01); *G02B 27/0172* (2013.01); *G02F 1/133531* (2021.01); *G02F 1/133536* (2013.01); *G02F 1/133567* (2021.01); *G06F 1/163* (2013.01); *G02F 2413/01* (2013.01); *G02F 2413/02* (2013.01); *G02F 2413/06* (2013.01); *G02F 2413/08* (2013.01); *G02F 2413/12* (2013.01)

(58) Field of Classification Search
CPC ......... G02F 1/133634; G02F 1/133567; G02F 1/133531; G02F 1/133536
See application file for complete search history.

(56) References Cited

U.S. PATENT DOCUMENTS

| 11,385,503 B2 * | 7/2022 | Hayashi ............ G02F 1/133634 |
| 11,550,187 B2 * | 1/2023 | Kawahira ......... G02F 1/133567 |
| 2020/0192165 A1 * | 6/2020 | Hasegawa ............ G02B 5/3083 |
| 2021/0373382 A1 * | 12/2021 | Sakai ................ G02F 1/133524 |

FOREIGN PATENT DOCUMENTS

| WO | 2012/090769 A1 | 7/2012 | |
| WO | WO-2012105428 A1 * | 8/2012 | ........... G02B 5/3025 |

* cited by examiner

*Primary Examiner* — Mariceli Santiago
(74) *Attorney, Agent, or Firm* — ScienBiziP, P.C.

(57) ABSTRACT

Provided is a liquid crystal display device having high luminance and high CR in a front direction and especially useful as a head-mounted liquid crystal display device, for example. The liquid crystal display device includes: a liquid crystal panel; an optical element; and a backlight, arranged in this order from a viewing surface side. The optical element includes a first polarizer, a retardation layer, and a second polarizer. The first polarizer, the retardation layer, and the second polarizer are arranged in this order from the viewing surface side. The first polarizer and the second polarizer are reflection polarizers. A reflection axis of the first polarizer and a reflection axis of the second polarizer are parallel to each other. In oblique directions at azimuths of 0°, 45°, and 90° at a polar angle of 60°, a polarization state of light incident on the first polarizer is elliptical polarization.

8 Claims, 26 Drawing Sheets

LIQUID CRYSTAL DISPLAY DEVICE

CROSS-REFERENCE TO RELATED APPLICATIONS

The present application claims priority under 35 U.S.C. § 119 to Japanese Patent Application No. 2022-080241 filed on May 16, 2022, the contents of which are incorporated herein by reference in their entirety.

BACKGROUND OF THE INVENTION

Field of the Invention

The present disclosure relates to a liquid crystal display device.

Description of Related Art

A liquid crystal display device is a display device using a liquid crystal material for display, and generally includes optical elements such as a polarizing plate and a retarder as well as a liquid crystal panel and a backlight. The liquid crystal display device has been used in a wide range of fields by taking advantages of its features such as excellent display characteristics, small thickness, light weight, and low power consumption.

In a technique known in the field of liquid crystal display devices, viewing angle characteristics of light radiated from a backlight are controlled by using optical elements such as a polarizing plate and a retarder. WO 2012/090769, for example, describes a liquid crystal display device in which a liquid crystal panel, a first polarizer, a birefringence layer, a second polarizer, and a backlight are arranged in this order, a transmission axis of the first polarizer and a transmission axis of the second polarizer are parallel to each other, a biaxial parameter of the birefringence layer is limited to a predetermined range, and a thickness direction phase difference of the birefringence layer or an angle formed by the transmission axis of the first polarizer and an in-plane slow axis of the birefringence layer is limited to a predetermined range.

BRIEF SUMMARY OF THE INVENTION

Wearable devices to be worn on the user's body have been developed and improved in recent years, and a head mounted display (HMD) is known as an example of a wearable device. The HMD is a display device that outputs an image such that a user can see the image with the HMD mounted on the head of the user. Examples of the HMD include a monocular HMD in which an image output unit is provided in front of one eye and an image from the image output unit and outside scenery enter the field of view at the same time, and a binocular HMD that completely covers both eyes so that the user sees only the display of the HMD. Among such HMDs, an HMD using liquid crystal is also called a head-mounted liquid crystal display device.

An HMD displays images at a close distance from an eyeball of a user, and thus, does not require a viewing angle characteristic as wide as other liquid crystal display devices (e.g., television set). On the other hand, in a front direction (e.g., within a polar angle of ±30°) corresponding to the eyeball of the user, high luminance and high contrast ratio (also referred to as CR) are required. In the conventional liquid crystal display device, however, luminance and CR are insufficient in the front direction.

FIG. 6 shows a cross-sectional schematic view illustrating an example of a liquid crystal display device having no polarizing plate louver (liquid crystal display device 100R according to Comparative Example 1), and a conceptual diagram illustrating axis azimuths of each optical element. As illustrated in FIG. 6, the liquid crystal display device 100R includes a first absorption polarizing plate 40, a liquid crystal panel 10, a second absorption polarizing plate 24 disposed in crossed Nicols with the first absorption polarizing plate 40, a reflection polarizing plate 23 disposed in parallel Nicols with the second absorption polarizing plate 24, and a backlight 30 in this order from a viewing surface side. In this device, first, oblique light obliquely incident on the liquid crystal panel 10 through the reflection polarizing plate 23 and the second absorption polarizing plate 24 from the backlight 30 is modulated to elliptically polarized light by, for example, a liquid crystal layer of the liquid crystal panel 10. Thereafter, the traveling direction of light is changed to the normal direction by scattering on a pair of substrates or the liquid crystal layer of the liquid crystal panel 10 (where the polarization state hardly changes before and after scattering). Then, the light passes through the first absorption polarizing plate 40 while being in the state of elliptically polarized light, and thus, is observed as light leakage depending on its ellipticity. Thus, a CR in the front direction (also referred to as a front CR) is insufficient, and a luminance in the front direction (also referred to as a front luminance) is also insufficient.

FIG. 8 shows a cross-sectional schematic view illustrating an example of a liquid crystal display device having a configuration with a polarizing plate louver (liquid crystal display device 100R according to Comparative Example 2) and a conceptual diagram illustrating axis azimuths of each optical element. As illustrated in FIG. 8, the liquid crystal display device 100R includes a first absorption polarizing plate 40, a liquid crystal panel 10, a second absorption polarizing plate 24 disposed in crossed Nicols with the first absorption polarizing plate 40, a retarder 22 having a phase difference in the thickness direction, a reflection polarizing plate 23 disposed in parallel Nicols with the second absorption polarizing plate 24, and a backlight 30 in this order from a viewing surface side. An in-plane slow axis of the retarder 22 is orthogonal to an absorption axis of the second absorption polarizing plate 24 and a reflection axis of the reflection polarizing plate 23. In this device, a polarization axis of oblique light transmitted through the reflection polarizing plate 23 from the backlight 30 is rotated by the retarder 22, and the oblique light is absorbed by the second absorption polarizing plate 24. Thus, as compared to the liquid crystal display device of Comparative Example 1 described above, the front CR is enhanced, but a total light flux amount decreases. That is, light emitted from the backlight 30 cannot be efficiently used as display light. Accordingly, the front luminance is insufficient. A portion from the second absorption polarizing plate 24 to the reflection polarizing plate 23 functions as an optical louver, and thus, will also be referred to as a polarizing plate louver.

FIG. 10 shows a cross-sectional schematic view illustrating an example of a liquid crystal display device (liquid crystal display device 100R according to Comparative Example 3) including a larger diaphragm of a polarizing plate louver than in the liquid crystal display device according to Comparative Example 2 described above, and a conceptual diagram illustrating axis azimuths of each optical element. In this device, as compared to the liquid crystal display device according to Comparative Example 2, the front CR can be further enhanced but the front luminance is still insufficient.

The liquid crystal display device described in WO 2012/090769 has high productivity and high CR and is useful for various applications. This device is especially useful for applications requiring a wide viewing angle characteristic such as a television set. The device has still room for improvement in order to further enhance luminance and CR in the front direction and have more suitability for HMDs.

It is therefore an object of the present invention to provide a liquid crystal display device having high luminance and high CR in a front direction and especially useful as a head-mounted liquid crystal display device, for example.

(1) In an embodiment of the present invention, a liquid crystal display device includes: a liquid crystal panel; an optical element; and a backlight, the liquid crystal panel, the optical element, and the backlight being arranged in this order from a viewing surface side, wherein the optical element includes a first polarizer, a retardation layer, and a second polarizer, the first polarizer, the retardation layer, and the second polarizer are arranged in this order from the viewing surface side, the first polarizer and the second polarizer are reflection polarizers, a reflection axis of the first polarizer and a reflection axis of the second polarizer are parallel to each other, and in oblique directions at an azimuth of 0°, an azimuth of 45°, and an azimuth of 90° at a polar angle of 60°, a polarization state of light incident on the first polarizer is elliptical polarization.

(2) In an embodiment of the present invention, the liquid crystal display device includes the structure (1), and the optical element further includes an absorption polarizer, the absorption polarizer is disposed on a viewing surface side of the first polarizer, and an absorption axis of the absorption polarizer, the reflection axis of the first polarizer, and the reflection axis of the second polarizer are parallel to one another.

(3) In an embodiment of the present invention, the liquid crystal display device includes the structure (2) and a transmittance of a structure including the absorption polarizer, the first polarizer, the retardation layer, and the second polarizer at a polar angle of 60° is 60% or less at each of three orientations of an azimuth of 0°, an azimuth of 45°, and an azimuth of 90°, where a front transmittance is 100%.

(4) In an embodiment of the present invention, the liquid crystal display device includes the structure (1), (2), or (3) and an angle formed by a slow axis of the retardation layer and the reflection axis of the first polarizer is 30° or more and 60° or less.

(5) In an embodiment of the present invention, the liquid crystal display device includes the structure (1), (2), (3), or (4) and the retardation layer includes two layers of a first retardation layer and a second retardation layer, each of the first retardation layer and the second retardation layer is a biaxial retardation layer including an in-plane phase difference R0 and a thickness direction phase difference Rth, the first retardation layer is disposed toward the first polarizer, a slow axis of the first retardation layer is 30° or more and 60° or less with respect to the reflection axis of the first polarizer, and a slow axis of the second retardation layer is orthogonal to the slow axis of the first retardation layer.

(6) In an embodiment of the present invention, the liquid crystal display device includes the structure (5) and each of the first retardation layer and the second retardation layer is in any one of modes (1), (2), and (3):

(1) a mode in which an NZ factor is $1.4 \leq NZ < 1.6$ and an absolute value $|R0|$ of an in-plane phase difference R0 satisfies the following inequalities (1-1) and (1-2):

$$|R0| \geq -325 \times NZ + 710 \quad (1\text{-}1)$$

$$|R0| \leq 225 \times NZ - 50 \quad (1\text{-}2),$$

(2) a mode in which the NZ factor is $1.6 \leq NZ < 3.0$ and the absolute value $|R0|$ of the in-plane phase difference R0 satisfies the following inequalities (2-1) and (2-2):

$$|R0| \leq -57 \times NZ + 281 \quad (2\text{-}1)$$

$$|R0| \geq -114 \times NZ + 493 \quad (2\text{-}2), \text{ and}$$

(3) a mode in which the NZ factor is $3.0 \leq NZ \leq 4.0$ and the absolute value $|R0|$ of the in-plane phase difference R0 satisfies the following inequalities (3-1) and (3-2):

$$|R0| \geq -10 \times NZ + 140 \quad (3\text{-}1)$$

$$|R0| \leq -40 \times NZ + 270 \quad (3\text{-}2).$$

(7) In an embodiment of the present invention, the liquid crystal display device includes the structure (1), (2), (3), (4), (5), or (6) and further includes an absorption polarizer on the viewing surface side of the liquid crystal panel.

(8) In an embodiment of the present invention, the liquid crystal display device includes the structure (1), (2), (3), (4), (5), (6), or (7) and the liquid crystal display device is a head-mounted liquid crystal display device.

The present invention can provide a liquid crystal display device having high luminance and high CR in a front direction and especially useful as a head-mounted liquid crystal display device, for example.

DETAILED DESCRIPTION OF THE INVENTION

Definition of Terms

Figure 1:
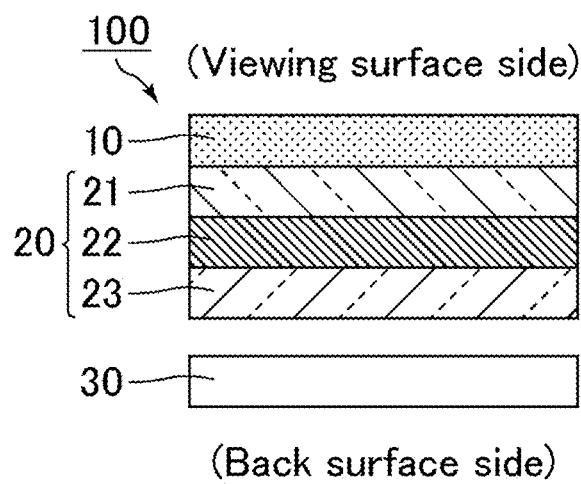
FIG. 1 is a cross-sectional schematic view illustrating an example of a liquid crystal display device according to Embodiment 1.

A viewing surface side herein refers to a side closer to a screen (display screen) of a liquid crystal display device, and a back surface side refers to a side farther from the screen (display screen) of the liquid crystal display device.

A polarizer refers to a substance having the function of extracting polarized light (linearly polarized light) vibrating only in a specific direction from unpolarized light (natural light), partially polarized light, or polarized light, and is distinguished from a circular polarizer (circular polarizing plate). An absorption polarizer is a polarizer that absorbs light vibrating in a specific direction and allows polarized light (linearly polarized light) vibrating in a direction perpendicular to the specific direction to pass therethrough. The reflection polarizer is a polarizer having the function of reflecting light vibrating in a specific direction and allowing polarized light (linearly polarized light) vibrating in a direction perpendicular to the specific direction to pass therethrough.

A retardation layer refers to a layer in which one of an absolute value |R0| of an in-plane phase difference R0 and an absolute value |Rth| of a thickness direction phase difference (also referred to as a thickness direction phase difference) Rth has a value of 10 nm or more. The retardation layer preferably refers to a layer having a value of 20 nm or more.

The in-plane phase difference R0 is defined by $R0 = (ns - nf)d$. The thickness direction phase difference Rth is defined by $Rth = \{nz - (nx + ny)/2\}d$. An NZ factor (biaxial parameter) is defined by $NZ = (nz - nx)/(ny - nx) = (Rth/R0) + 0.5$.

In the above equations, ns is a larger one of nx or ny, of is a smaller one of nx or ny, nx and ny are principal indices of refraction of a retardation layer in an in-plane direction, nz is a principal index of refraction in an out-plane direction, that is, a direction orthogonal to a surface of the retardation layer, and d is a thickness of the retardation layer.

Measurement wavelengths of optical parameters such as the principal indices of refraction, the phase difference, and the NZ factor are 550 nm unless otherwise specified.

A polar angle θ refers to an angle formed by a target direction (e.g., measurement direction) and the normal direction of the screen of the liquid crystal panel. An azimuth φ refers to a direction in which a target direction is projected onto the screen of the liquid crystal panel, and is expressed by an angle (azimuthal angle) formed by this direction and a reference azimuth. In this embodiment, a reference azimuth (φ=0°) is set at a horizontal right direction of the screen of the liquid crystal panel. The angle and the azimuthal angle are defined such that an angle counterclockwise from the reference orientation is a positive angle, and an angle clockwise from the reference orientation is a negative angle. The counterclockwise and clockwise directions are both rotation directions when the screen of the liquid crystal panel is seen from the viewing surface side (front). The angle represents a value measured when the liquid crystal panel is seen in a plan view. A state where two straight lines (including axes, directions, and ridges) are orthogonal to each other refers to a state where these lines are orthogonal to each other in a plan view of the liquid crystal panel.

The axis azimuth refers to an azimuth of an absorption axis (reflection axis) of a polarizer or a slow axis of a retardation layer unless otherwise specified. The slow axis of the retardation layer refers to an in-plane slow axis.

Liquid crystal display devices according to embodiments of the present invention will be described. The present invention is not limited to the contents described in the following embodiments, and design changes can be appropriately made within a range satisfying a configuration of the present invention.

Embodiment 1

FIG. 1 is a cross-sectional schematic view illustrating an example of a liquid crystal display device according to the present embodiment. As illustrated in FIG. 1, a liquid crystal display device 100 includes a liquid crystal panel 10, an optical element 20, and a backlight 30 in this order from a viewing surface side. The optical element 20 includes a first polarizer 21, a retardation layer 22, and a second polarizer 23 in this order from the viewing surface side. The first polarizer 21 and the second polarizer 23 are both reflection polarizers. In the following description, the first polarizer will also be referred to as a "first reflection polarizer," and the second polarizer will also be referred to as a "second reflection polarizer."

(Optical Element)

The optical element 20 including the first reflection polarizing plate 21, the retardation layer 22, and the second reflection polarizing plate 23 functions as an optical louver, and therefore, will also be referred to as a polarizing plate louver. The optical element 20 is generally bonded to the liquid crystal panel 10 by an adhesive layer (not shown).

The reflection axis of the first polarizer 21 and the reflection axis of the second polarizer 23 are parallel to each other. That is, the first polarizer 21 and the second polarizer 23 are disposed in parallel Nicols. More specifically, the reflection axis of the first polarizer 21 and the reflection axis of the second polarizer 23 form an angle within the range of 0°±10°. This angle is preferably within the range of 0°±5°.

In oblique directions at an azimuth of 0°, an azimuth of 45°, and an azimuth of 90° at a polar angle of 60°, the polarization state of light incident on the first polarizer 21 is elliptical polarization. The "light incident on the first polarizer 21" is light immediately before incident on the first polarizer 21 from the backlight 30 through at least the second polarizer 23 and the retardation layer 22.

Whether the elliptically polarization is clockwise or counterclockwise does not matter. The polarization state does not need to be complete polarization and may be partial polarization including a partially nonpolarized state.

The liquid crystal display device according to the present embodiment includes the optical element 20 in which the retardation layer 22 for providing a polarizing plate louver function is sandwiched between the pair of reflection polarizing plates 21 and 23. Accordingly, oblique light that is absorbed in a conventional polarizing plate louver (e.g., polarizing plate louver in which the retarder 22 having a phase difference in the thickness direction is disposed between the second absorption polarizing plate 24 and the reflection polarizing plate 23, as in a liquid crystal display device of Comparative Example 2 described later) can be reflected toward the backlight 30 without being absorbed. Light reflected toward the backlight 30 is reflected toward the liquid crystal panel 10 again by a lens sheet, a light guide plate, a reflector, and other members in the backlight 30, and a part of the reflected light is eventually emitted again (i.e., recycled) in the front direction of the liquid crystal panel 10 through repetitive multiple reflection. That is, oblique light is actively regressed toward the backlight 30, and is saved to the front direction by multiple reflection in the backlight 30. Accordingly, efficiency in utilizing light from the backlight 30 can be increased without impairing the amount of light flux so that front luminance can be thereby efficiently enhanced. In addition to such a configuration, in each of the oblique directions at an azimuth of 0°, an azimuth of 45°, and an azimuth of 90° at a polar angle of 60°, the polarization state of light incident on the first polarizer 21 is elliptically polarized light as described above. Accordingly, high levels of front luminance and front CR as required for HMDs can be achieved.

The first reflection polarizer 21 includes a transmission axis and a reflection axis orthogonal to the transmission axis. The second reflection polarizer 23 includes a transmission axis and a reflection axis orthogonal to the transmission axis. Materials and optical performance of these polarizers are not particularly limited as long as the polarizers are reflection polarizers. Specifically, for example, a reflection polarizer obtained by uniaxially stretching a co-extrusion film made of two types of resins (e.g., APCF available from Nitto Denko Corporation, DBEF available from 3M), a reflection polarizer in which metal thin lines of metal wires are periodically arranged (i.e., so-called wire grid polarizer), and other polarizers can be appropriately used.

The polarizers (reflection polarizer and absorption polarizer) included in the liquid crystal display device according to the present invention may have plate shapes (such polarizers will be referred to as polarizing plates). That is, each polarizer is preferably a polarizing plate. Examples of the polarizing plate include a polarizing plate in which a protective film (not shown) such as a triacetylcellulose (TAC) film is laminated on at least one of a viewing surface side or a back surface side of an element having a polarization function in order to obtain mechanical strength and resistance to moist heat, for example. The protective film is bonded to the element with an optional appropriate adhesive layer (not shown).

The adhesive layer herein refers to an adhesive layer that joins faces of adjacent optical elements and units the optical elements by a practically sufficient adhesive force in a practically sufficient adhesive time. Examples of a material for the adhesive layer include an adhesive and an anchor coat agent. The adhesive layer may have a multilayer structure in which an anchor coat layer is formed on a surface of an adherend, and an adhesive layer is formed on the anchor coat layer. The adhesive layer may be a thin layer that is imperceptible to naked eyes.

Each of the axis azimuths of the first reflection polarizer 21 and the second reflection polarizer 23 can be appropriately set, and is preferably set within the range of 0°±10° or 90°±10°, for example. In particular, each axis azimuth is more preferably set within the range of 0°±5° or 90°±5°, and even more preferably set at substantially 0° or 90°. Accordingly, display that is bright in the normal direction and in the top-bottom and left-right directions can be achieved.

The angle formed by the slow axis of the retardation layer 22 and the reflection axis of the first reflection polarizer 21 is preferably 30° or more and 60° or less. Accordingly, the front luminance and the front CR can be further enhanced. The angle is more preferably 45°±10°, even more preferably 45°±5°. For example, in a case where the axis azimuth of the first reflection polarizer 21 is 90°, the slow axis of the retardation layer 22 is preferably 30° to 60° or 120° to 150°. The slow axis is more preferably 45°±10° or 135°±10°, even more preferably 45°±5° or 135°±5°, especially preferably 45°±1° or 135°+1°.

As described above, the retardation layer 22 is preferably a biaxial retardation layer which includes the in-plane phase difference R0 and the thickness direction phase difference Rth and in which at least one of the absolute value |R0| of the in-plane phase difference R0 or the absolute value |Rth| of the thickness direction phase difference Rth is 10 nm or more (preferably 20 nm or more). Specifically, both of |R0| and |Rth| are preferably 10 nm or more, more preferably 20 nm or more.

The retardation layer 22 is preferably the biaxial retardation layer as described above. In particular, the NZ factor serving as an index of the biaxial parameter preferably satisfies 1≤NZ≤10. Accordingly, the polarization state of light incident on the first reflection polarizer 21 can be easily controlled. That is, in each of the oblique directions at an azimuth of 0°, an azimuth of 45°, and an azimuth of 90° at a polar angle of 60°, the polarization state of light incident on the first polarizer 21 can easily approach linear polarization parallel to the absorption axis of the first polarizer 21. More preferably, 1.2≤NZ≤5.0 is satisfied, and even more preferably 1.4≤NZ≤4.0 is satisfied.

In this embodiment, in a case where the retardation layer 22 is formed of two or more layers (in the case of (B) below), at least one of the two layers included in the retardation layer 22 preferably satisfies the range described above. However, from the viewpoint of easing control of the polarization state, the NZ factors of all the layers included in the retardation layer 22 between the first reflection polarizer 21 and the second reflection polarizer 23 preferably satisfy 1≤NZ<10.

The absolute value |R0| of the in-plane phase difference R0 of the retardation layer 22 is preferably 50 nm or more. The absolute value |R0| is more preferably 80 nm or more, even more preferably 100 nm or more. The absolute value |R0| is preferably 500 nm or less. The absolute value |R0| is more preferably 400 nm or less, even more preferably 350 nm or less. The absolute value |Rth| of the thickness direction phase difference Rth of the retardation layer 22 is preferably set such that the NZ factor is within the range described above.

Figure 2:
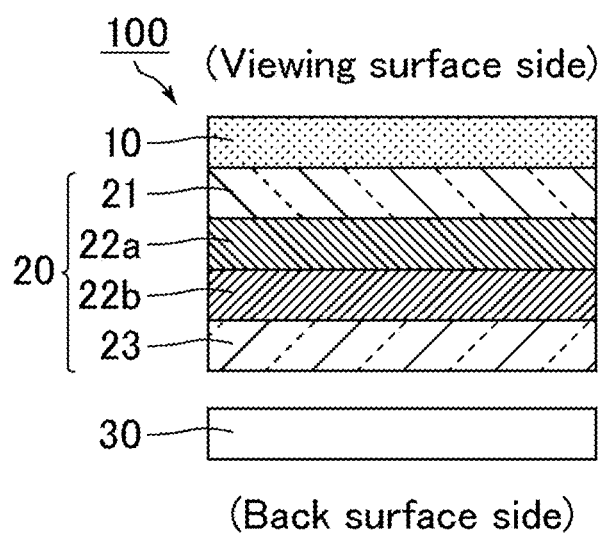
FIG. 2 is a cross-sectional schematic view illustrating another example of the liquid crystal display device according to Embodiment 1.

The number of layers included in the retardation layers 22 may be: (A) only one as illustrated in FIG. 1 (i.e., the retardation layer 22 may be formed of a single layer); or (B) more than one as illustrated in FIG. 2 (i.e., the retardation layer 22 may be formed of two or more layers).

In the case of (B), in the layers included in the retardation layers 22 (e.g., 22a and 22b), each slow axis preferably forms an angle of 30° or more and 60° or less with respect to the reflection axis of the first reflection polarizer 21. The more preferable ranges of the angle have been described above. The slow axes of adjacent retardation layers are preferably orthogonal to each other. That is, the slow axis of the retardation layer 22a is preferably orthogonal to the slow axis of the retardation layer 22b. The term "orthogonal" herein refers to an angle within the range of 90°±10°. More preferably, the term "orthogonal" refers to an angle within the range of 90°±5°.

The retardation layer 22 preferably exhibits reverse wavelength dispersion. Accordingly, when the liquid crystal display device is observed in an oblique direction, coloring of a display color (especially white display) can be suppressed. Specifically, the ratio (R450/R550) of an in-plane phase difference R0 at a wavelength of 450 nm to an in-plane phase difference R0 at a wavelength of 550 nm is preferably 0.80 or more and 0.99 or less, more preferably 0.82 or more and 0.90 or less. In addition, the ratio (R650/R550) of an in-plane phase difference R0 at a wavelength of 650 nm to an in-plane phase difference R0 at a wavelength of 550 nm is preferably 1.01 or more and 1.20 or less, more preferably 1.02 or more and 1.18 or less.

In the case of (B), if at least one of the layers included in the retardation layer 22 exhibits reverse wavelength dispersion, a coloring suppression effect can be obtained to some degree, but in terms of coloring suppression, it is more preferable for all the layers included in the retardation layer 22 between the first polarizer 21 and the second polarizer 23 to exhibit reverse wavelength dispersion.

The layers included in the retardation layer 22 (e.g., 22a and 22b) are preferably substantially the same layers (i.e., layers formed of substantially the same material by substantially the same process and showing substantially the same characteristics). A first reason is economic rationality. In a case where the layers included in the retardation layer 22 have plate shapes (retarders), since such layers are generally manufactured in a large mass of long rolls at a time, manufacturing costs can be reduced by using the same layers of minimum types. A second reason is an advantage in which the use of the same retardation layers increases the possibility of no remaining phase difference in consideration of manufacturing variations.

FIG. 2 is a cross-sectional schematic view illustrating an example configuration in which the retardation layer 22 includes two layers of the first retardation layer 22a and the second retardation layer 22b. The first retardation layer 22a and the second retardation layer 22b are biaxial retardation layers each including the in-plane phase difference R0 and the thickness direction phase difference Rth. The first retardation layer 22a is disposed closer to the first reflection polarizer 21, that is, closer to the viewing surface side, than the second retardation layer 22b is. The slow axis of the first retardation layer 22a is 30° or more and 60° or less, preferably 45°±10°, more preferably 45°±5°, with respect to the reflection axis of the first reflection polarizer 21. The slow axis of the second retardation layer 22b is orthogonal to the slow axis of the first retardation layer 22a. The angle formed by the slow axis of the first retardation layer 22a and the slow axis of the second retardation layer 22b is within the range of 90°±10° (preferably 90°±5°).

In the case where the retardation layer 22 includes two layers of the first retardation layer 22a and the second retardation layer 22b as illustrated in FIG. 2, the first retardation layer 22a and the second retardation layer 22b are preferably substantially the same layers as described above, and more preferably, the NZ factors of the first retardation layer 22a and the second retardation layer 22b satisfy 1.4≤NZ≤4.0 as described above. In particular, in a case (1) where the NZ factors of the first retardation layer 22a and the second retardation layer 22b are 1.4≤NZ<1.6, the absolute value |R0| of the in-plane phase difference R0 preferably satisfies inequalities (1-1) and (1-2) below. Accordingly, the luminance and the CR in the front direction can be further enhanced.

$$|R0| \geq -325 \times NZ + 710 \quad (1\text{-}1)$$

$$|R0| \leq 225 \times NZ - 50 \quad (1\text{-}2)$$

In a case (2) where the NZ factors of the first retardation layer 22a and the second retardation layer 22b are 1.6≤NZ<3.0, the absolute value |R0| of the in-plane phase difference R0 preferably satisfies inequalities (2-1) and (2-2) below. Accordingly, the luminance and the CR in the front direction can be further enhanced.

$$|R0| \geq -57 \times NZ + 281 \quad (2\text{-}1)$$

$$|R0| \leq -114 \times NZ + 493 \quad (2\text{-}2)$$

Furthermore, in a case (3) where the NZ factors of the first retardation layer 22a and the second retardation layer 22b are 3.0≤NZ≤4.0, the absolute value |R0| of the in-plane phase difference R0 preferably satisfies inequalities (3-1) and (3-2) below. Accordingly, the luminance and the CR in the front direction can be further enhanced.

$$|R0| \geq -10 \times NZ + 140 \quad (3\text{-}1)$$

$$|R0| \leq -40 \times NZ + 270 \quad (3\text{-}2)$$

A material for the retardation layer 22 is not particularly limited, and may be a material obtained by stretching a polymer film, a material obtained by fixing of the alignment of a liquid crystalline material, a thin plate of an inorganic material, and so forth. A method for forming the retardation layer 22 is not particularly limited. In the case of forming the retardation layer 22 from a polymer film, a solvent casting method or a fusion extrusion method, for example, can be used. A method for forming a plurality of retardation layers 22 at the same time by co-extrusion may also be employed. Stretching may or may not be performed as long as a desired phase difference appears. The stretching method is not particularly limited, and a roll-to-roll draw stretching method, a roll-to-roll compression stretching method, a tenter transverse uniaxial stretching method, an oblique stretching method, a longitudinal and transverse biaxial stretching method, and a special stretching method of performing stretching under the effect of a shrinkage force of a heat-shrinkable film. In the case of forming the retardation layer 22 from a liquid crystalline material, a liquid crystalline material is applied onto a base film subjected to an alignment treatment and alignment is fixed, for example. As long as a desired phase difference appears, a method such as a method of performing no special alignment treatment on the base film or a method of fixing alignment and then peeling a material off from the base film and transferring the material onto another film may be employed. A method of not fixing alignment of a liquid crystalline material may also be used. In the case of forming the retardation layer 22 from a non-liquid crystalline material, a formation method similar to that in the case of forming the retardation layer 22 from a liquid crystalline material may be employed.

As the retardation layer 22, a layer obtained by stretching a film including a material having a positive intrinsic birefringence may be appropriately used, for example. Examples of the material having a positive intrinsic birefringence include polycarbonate, polysulfone, polyethersulfone, polyethylene terephthalate, polyethylene, polyvinyl alcohol, norbornene, triacetylcellulose, diacetyl cellulose, and cycloolefin polymer.

(Liquid Crystal Panel)

A liquid crystal mode of the liquid crystal panel 10 is not particularly limited, and black display may be provided by aligning liquid crystal molecules in a liquid crystal layer perpendicularly to a substrate surface, or may be provided by aligning liquid crystal molecules in the liquid crystal layer in parallel with, or in a direction neither perpendicular nor parallel to, the substrate surface. A method for driving a liquid crystal panel may be a simple matrix method (passive matrix method) or a plasma address method, for example, in addition to a TFT method (active matrix method).

Examples of the configuration of the liquid crystal panel 10 include a configuration in which a liquid crystal layer is sandwiched between a pair of substrates one of which includes a pixel electrode and a common electrode, and a voltage is applied across the pixel electrode and the common electrode to apply a transverse electric field (including a fringe field) to the liquid crystal layer for display; and a configuration in which a liquid crystal layer is sandwiched between a pair of substrates one of which includes a pixel electrode and the other of which includes a common electrode, and a voltage is applied across the pixel electrode and the common electrode to apply a longitudinal electric field to the liquid crystal layer for display. More specifically, the transverse electric field mode includes a fringe field switching (FFS) mode and an in-plane switching (IPS) mode in which liquid crystal molecules in the liquid crystal layer are aligned in parallel to the substrate surface during application of no voltage. The longitudinal electric field mode includes a vertical alignment (VA) mode in which liquid crystal molecules in the liquid crystal layer are aligned vertically to the substrate surface during application of no voltage.

(Backlight)

The backlight 30 is not particularly limited as long as the backlight 30 applies light, and may be of any type such as a direct-lit backlight and an edge-lit backlight. Specifically, for example, the backlight 30 preferably includes a light source unit including a light guide plate and a light source, a reflective sheet, and a diffuser. As the light source, a light emitting diode (LED) can be used.

(Other Members)

In addition to the members described above, the liquid crystal display device according to the present embodiment includes members such as: an external circuit exemplified by a tape carrier package (TCP) and a printed circuit board (PCB); an optical film exemplified by a viewing angle expansion film and a luminance enhancement film; and a bezel (frame), and one or more of the members may be incorporated in other members. Members other than the members described above are not particularly limited, and members generally used in the field of liquid crystal display devices can be used, and thus, will not be described.

(HMD)

Figure 3:
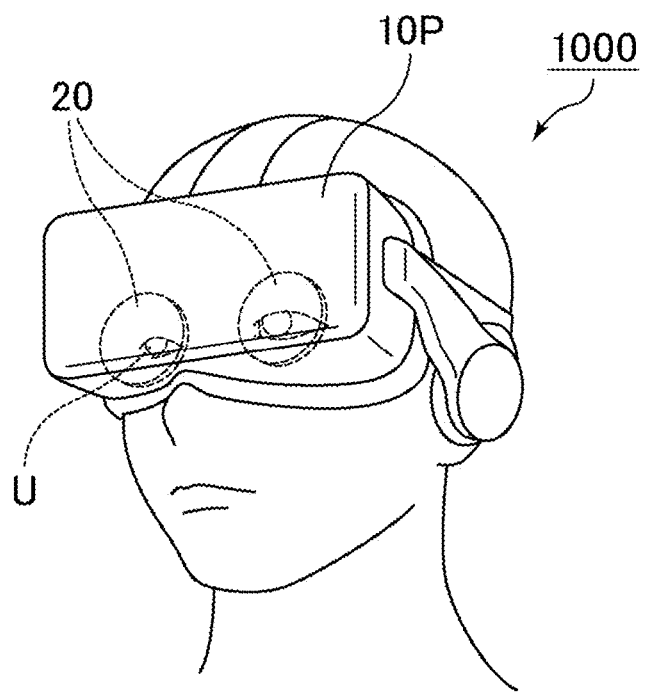
FIG. 3 is a perspective schematic view illustrating appearance of the liquid crystal display device according to Embodiment 1 when used as an HMD.

FIG. 3 is a perspective schematic view illustrating an example of appearance when the liquid crystal display device according to the present embodiment is used as a head-mounted display (HMD), that is, when the liquid crystal display device is used as a head-mounted liquid crystal display device. As illustrated in FIG. 3, a head-mounted display 1000 includes a liquid crystal panel 10P that displays an image, an optical element 20, and a backlight (not shown), and is attachable to the head of a user U. Although FIG. 3 shows a binocular HMD, the liquid crystal display device according to the present invention can also be suitably used as a monocular HMD.

In the case of using the liquid crystal display device according to the present embodiment as an HMD, the display mode is not particularly limited, and display modes such as a horizontal alignment mode and a vertical alignment mode can be preferably employed. For example, an HMD using the horizontal alignment mode preferably employs a technique in which an opening shape of an electrode for use in forming a fringe field has a feature, as described in JP 2019-113584 A.

Embodiment 2

In the present embodiment, characteristics unique to the present embodiment will be mainly described, and members and parts already described in Embodiment 1 will not be described. In Embodiment 2, an optical element 20 further includes an absorption polarizer 24 on a viewing surface side of a first reflection polarizer 21. The absorption polarizer 24 will also be referred to as a "second absorption polarizer" to distinguish the absorption polarizer 24 from an absorption polarizer 40 that may be disposed on a viewing surface side of a liquid crystal panel.

Figure 4:
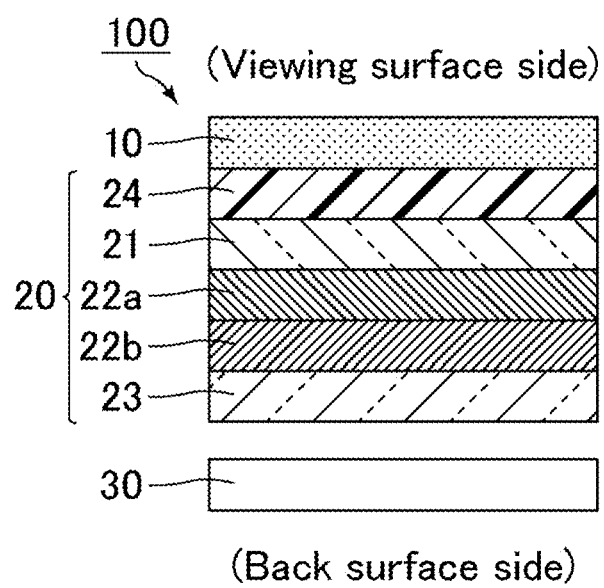
FIG. 4 is a cross-sectional schematic view illustrating an example of a liquid crystal display device according to Embodiment 2.

FIG. 4 is a cross-sectional schematic view illustrating an example of a liquid crystal display device according to the present embodiment. More specifically, FIG. 4 is a cross-sectional schematic view illustrating an example configuration in which the optical element 20 of the liquid crystal display device illustrated in FIG. 2 further includes the absorption polarizer 24. As illustrated in FIG. 4, the liquid crystal display device 100 includes a liquid crystal panel 10, the optical element 20, and a backlight 30 in this order from a viewing surface side. The optical element 20 includes the absorption polarizer 24, the first reflection polarizer 21, layers constituting the retardation layer 22 (first and second retardation layers 22a and 22b), and a second reflection polarizer 23 in this order from the viewing surface side.

An absorption axis of the second absorption polarizer 24, a reflection axis of the first reflection polarizer 21, and a reflection axis of the second reflection polarizer 23 are parallel to one another. That is, the second absorption polarizer 24, the first reflection polarizer 21, and the second reflection polarizer 23 are arranged in parallel Nicols. More specifically, the absorption axis of the second absorption polarizer 24 and the reflection axis of the first reflection polarizer 21 form an angle within the range of 0°±10° (preferably 0°±5°), and the reflection axis of the first reflection polarizer 21 and the reflection axis of the second reflection polarizer 23 form an angle within the range of 0°±10° (preferably 0°±5°).

A material and optical performance of the second absorption polarizer 24 are not particularly limited as long as the second absorption polarizer 24 is an absorption polarizer. Specifically, for example, an absorption polarizer in which an anisotropic material such as an iodine complex having dichroism is adsorbed and aligned to a polyvinyl alcohol (PVA) film can be appropriately used.

A transmittance of a structure including the absorption polarizer 24, the first reflection polarizer 21, the retardation layer 22, and the second reflection polarizer 23 (i.e., a portion including parts closer to the back surface side than the liquid crystal panel 10 is) at a polar angle of 60° is preferably 60% or less at each of three azimuths of an azimuth of 0°, an azimuth of 45°, and an azimuth of 90°. It should be noted that the front transmittance is 100%. Accordingly, the front luminance and the front CR can be further enhanced. In particular, from the viewpoint of further enhancing the front CR, the transmittance at an azimuth of 45° is preferably 40% or less, more preferably 30% or less, even more preferably 25% or less.

The front transmittance refers to a transmittance in the front direction (within a polar angle of ±30°) in a case where the structure includes no retardation layers).

The transmittance can be obtained by calculating a transmittance viewing angle (also referred to as a transmittance viewing angle characteristic) for the structure. The calculation uses an "LCD Master" available from Shintech, Inc. Since the structure described above is disposed closer to the back surface side than the liquid crystal panel is, light distribution of light from the backlight incident on the liquid crystal panel can be obtained by calculating a transmittance viewing angle characteristic.

Embodiment 3

In the present embodiment, characteristics unique to the present embodiment will be mainly described, and members and parts already described in Embodiment 1 will not be described. In Embodiment 3, a liquid crystal display device further includes an absorption polarizer 40 on a viewing surface side of a liquid crystal panel 10. The absorption polarizer 40 will also be referred to as a "first absorption polarizer."

Figure 5:
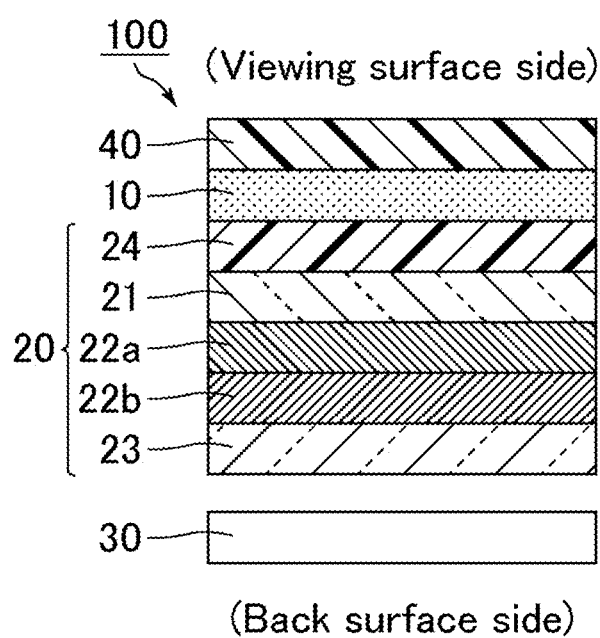
FIG. 5 is a cross-sectional schematic view illustrating an example of a liquid crystal display device according to Embodiment 3.

FIG. 5 is a cross-sectional schematic view illustrating an example of a liquid crystal display device according to the present embodiment. More specifically, FIG. 5 is a cross-sectional schematic view illustrating an example configuration in which the liquid crystal display device illustrated in FIG. 4 (Embodiment 2) further includes the first absorption polarizer 40 on a viewing surface side of a liquid crystal panel 10. As illustrated in FIG. 5, the liquid crystal display device 100 includes a first absorption polarizer 40, the liquid crystal panel 10, an optical element 20, and a backlight 30 in this order from a viewing surface side. The optical element 20 includes an absorption polarizer 24, a first reflection polarizer 21, layers constituting the retardation layer 22 (first and second retardation layers 22a and 22b), and a second reflection polarizer 23 in this order from the viewing surface side.

An axis azimuth of an absorption axis of the first absorption polarizer 40 is not particularly limited, and is preferably disposed to be orthogonal to reflection axes of the first reflection polarizer 21 and the second reflection polarizer. That is, the first absorption polarizer 40 and the first and second reflection polarizers 21 and 23 are preferably arranged in crossed Nicols. More specifically, the absorption axis of the absorption polarizer 24 and the reflection axis of the first reflection polarizer 21 form an angle within the range of 90°±10° (preferably 90°±5°), and the reflection axis of the first reflection polarizer 21 and the reflection axis of the second reflection polarizer 23 form an angle within the range of 0°±10° (preferably 0°±5°).

A material and optical performance of the first absorption polarizer 40 are not particularly limited as long as the first absorption polarizer 40 is an absorption polarizer. Specifically, for example, an absorption polarizer in which an anisotropic material such as an iodine complex having dichroism is adsorbed and aligned to a polyvinyl alcohol (PVA) film can be appropriately used.

EXAMPLES

Hereinafter, the present invention will be described in more detail with reference to examples and comparative examples, but the present invention is not limited to these examples. In FIGS. 6, 8, 10, 12, 21, and 23, an angle shown at the right of each layer in each cross-sectional schematic view refers to an azimuthal angle of an absorption axis for an absorption polarizing plate, an azimuthal angle of a reflection angle for a reflection polarizing plate, an azimuthal angle of a slow axis for a retarder, and an azimuthal angle of a slow axis for a liquid crystal panel.

Comparative Example 1

Figure 6:
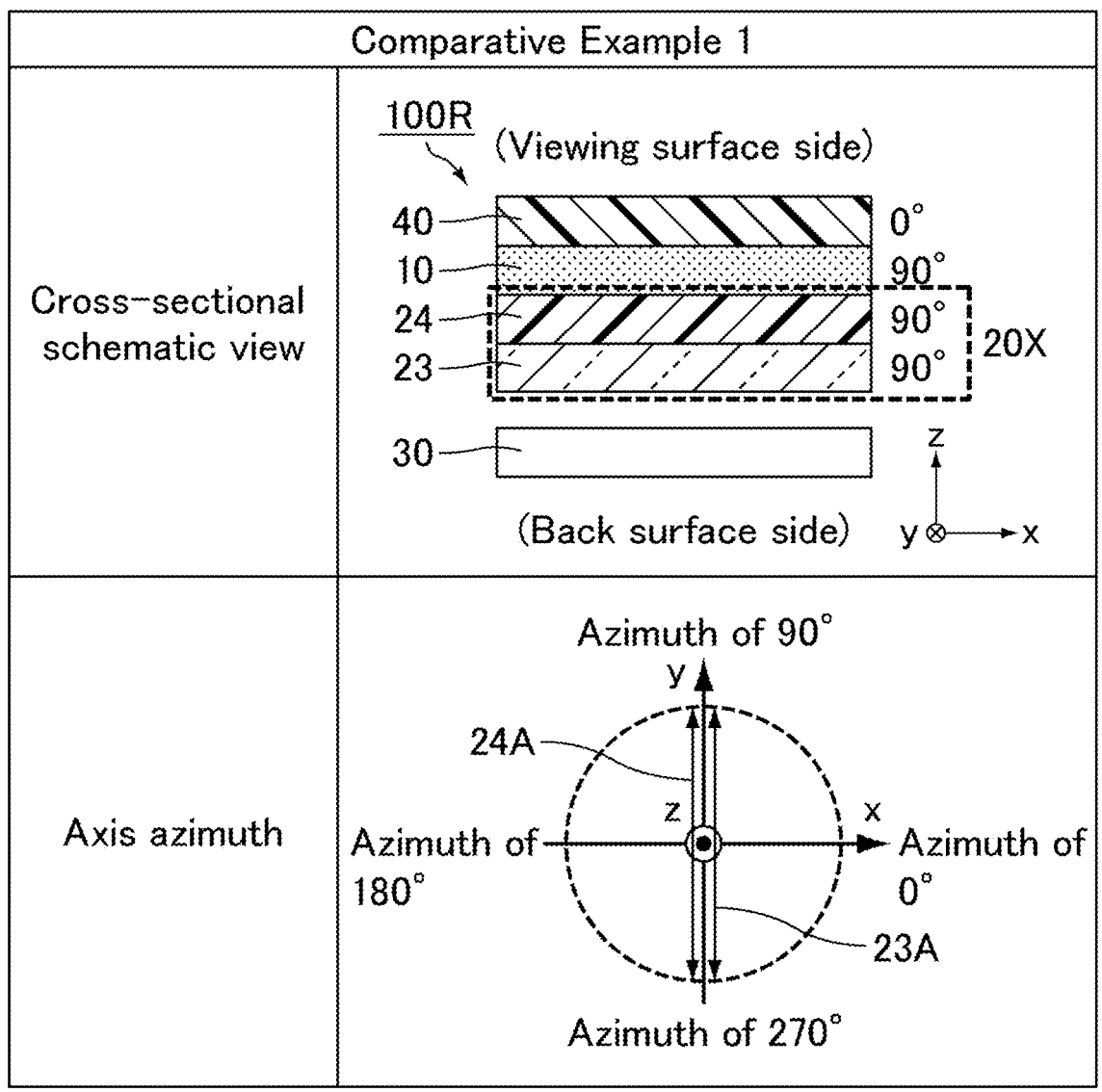
FIG. 6 shows a cross-sectional schematic view illustrating a configuration of a liquid crystal display device according to Comparative Example 1 and a conceptual diagram illustrating axis azimuths of each optical element.

A liquid crystal display device of Comparative Example 1 is a head-mounted liquid crystal display device as illustrated in FIG. 3. As illustrated in FIG. 6, the device includes a first absorption polarizing plate 40, a liquid crystal panel 10, a second absorption polarizing plate 24 disposed in crossed Nicols with the first absorption polarizing plate 40, a reflection polarizing plate 23 disposed in parallel Nicols with the second absorption polarizing plate 24, and a backlight 30 in this order from a viewing surface side. FIG. 6 shows illustrations for describing a configuration of the liquid crystal display device of Comparative Example 1. FIG. 6 also shows axis azimuths of optical elements between the liquid crystal panel 10 and the backlight 30. As each of the absorption polarizing plates 40 and 24, an absorption polarizing plate in which an iodine complex having dichroism is adsorbed and aligned to a polyvinyl alcohol (PVA) film was used. As the reflection polarizing plate 23, a reflection polarizer APF available from 3M was used. As the liquid crystal panel 10, a high-resolution liquid crystal panel (2.5 inch, 1200 ppi) for head mount application was used. As the backlight 30, a cross brightness enhancement film (BEF) backlight in which two lens sheets obliquely intersect each other was used.

Figure 7:
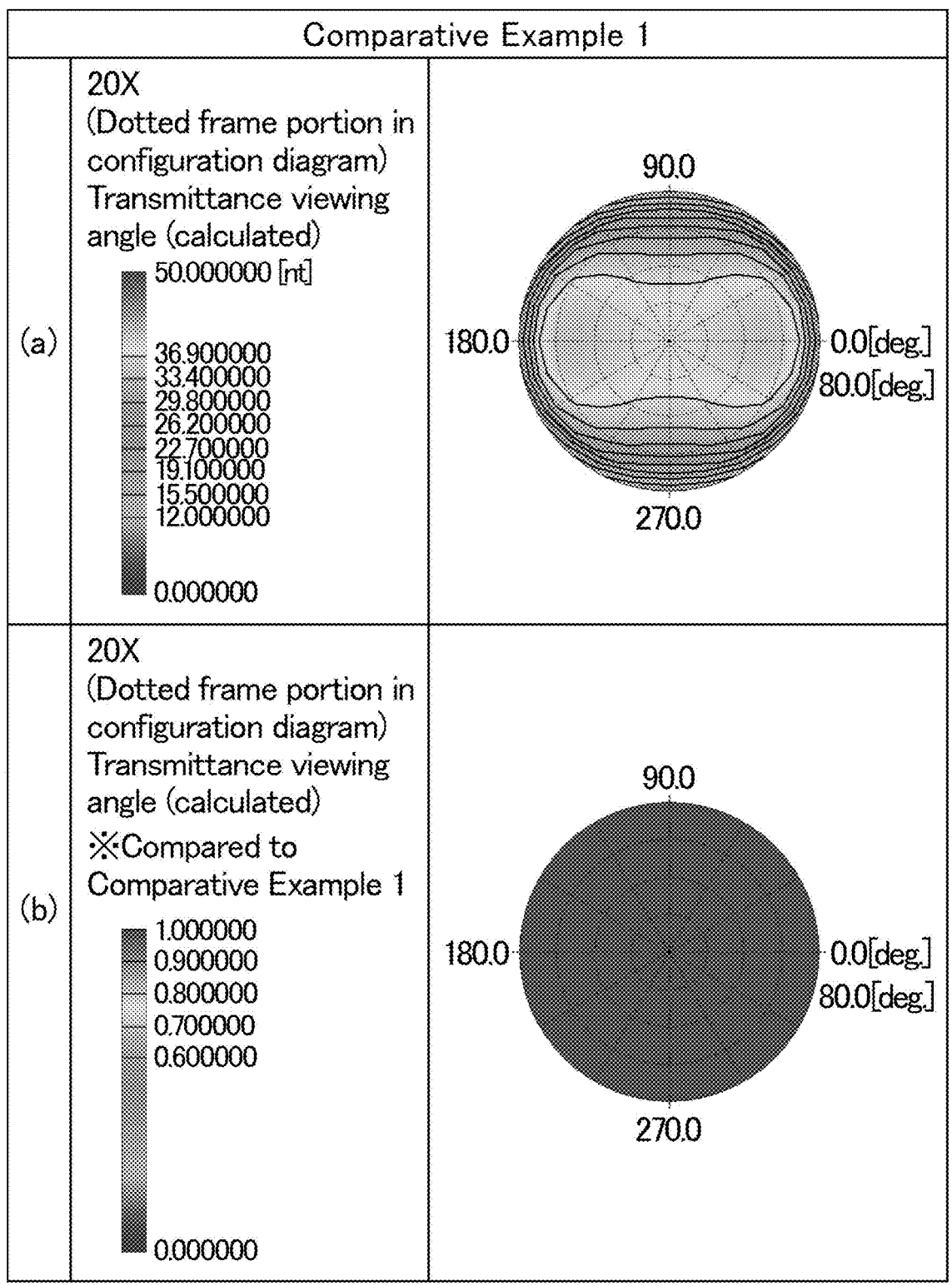
FIG. 7 shows results of calculation of a transmittance viewing angle for a portion 20X of the liquid crystal display device according to Comparative Example 1.

To obtain light distribution of light from the backlight incident on the liquid crystal panel of Comparative Example 1, a transmittance viewing angle only of parts disposed closer to the back surface side than the liquid crystal panel is, that is, the portion 20X including the second absorption polarizing plate 24 and the reflection polarizing plate 23, was calculated. This calculation used an "LCD Master" manufactured by Shintech, Inc. FIG. 7 shows results (section (a)). FIG. 7 also shows a chart normalized by dividing the result of the transmittance viewing angle calculated in the present example by the result of Comparative Example 1 (section (b)). Since Comparative Example 1 is a reference for comparison, the section (b) in FIG. 7 shows that the transmittance viewing angle is "1.000000" in the entire surface.

A prototype of the liquid crystal display device (head-mounted liquid crystal display device) of Comparative Example 1 was actually fabricated, and a white luminance and a black luminance in the front direction were measured with an "SR-UL1" available from TOPCON Corporation so that a ratio thereof was used as a contrast ratio (CR=white luminance/black luminance) in the front direction. Table 1 shows a white luminance in the front direction (hereinafter referred to as a front luminance) and a CR in the front direction (hereinafter referred to as a front CR). The white luminance and the CR are both actually measured values. As shown in Table 1, in the liquid crystal display device of Comparative Example 1, both the front luminance and the front CR are insufficient, and reasons for this have been described above.

Comparative Example 2

Figure 8:
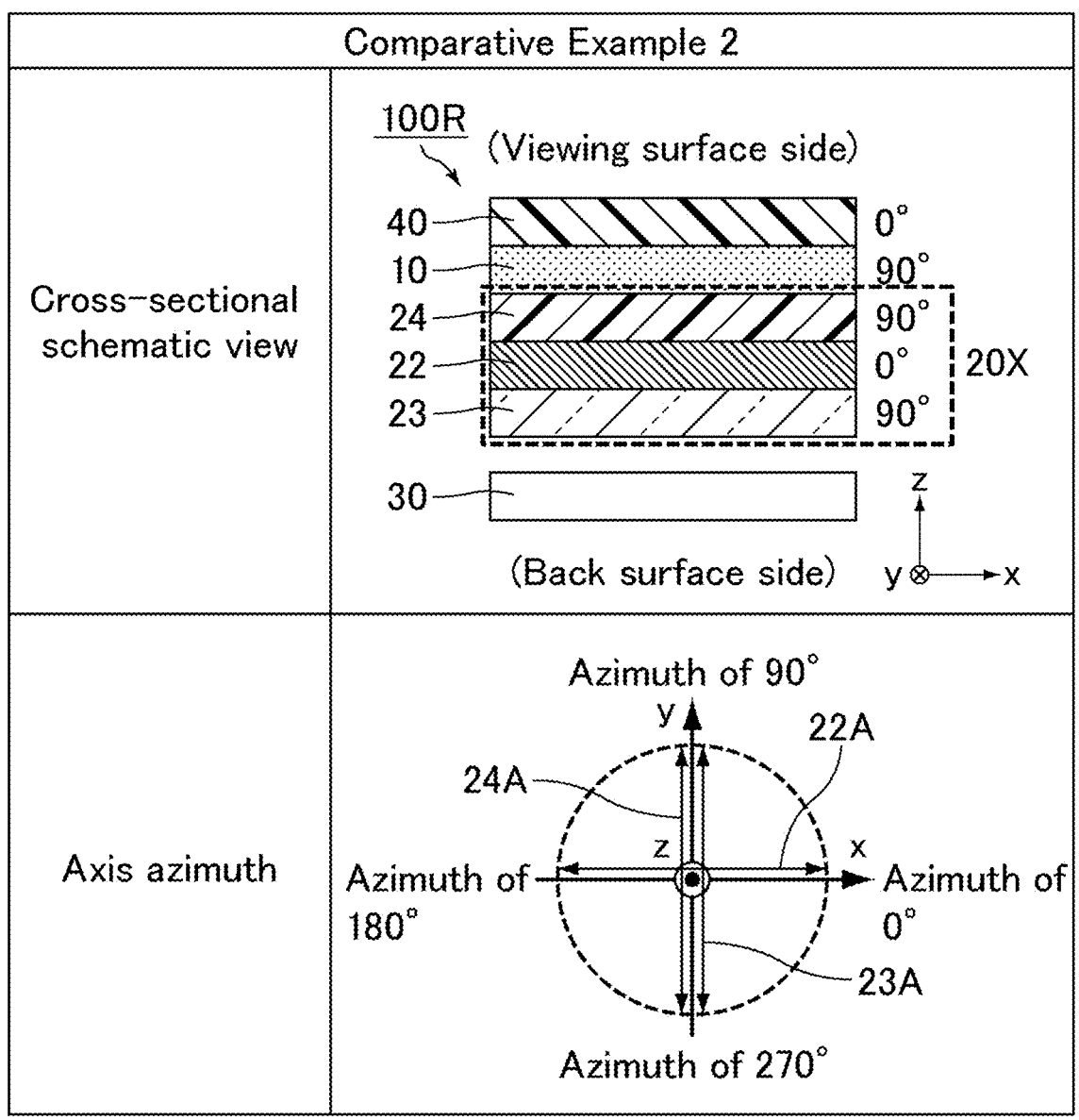
FIG. 8 shows a cross-sectional schematic view illustrating a configuration of a liquid crystal display device according to Comparative Example 2 and a conceptual diagram illustrating axis azimuths of each optical element.

A liquid crystal display device of Comparative Example 2 has the same configuration as the liquid crystal display device of Comparative Example 1 except that the retarder 22 is disposed between the second absorption polarizing plate 24 and the reflection polarizing plate 23 such that the slow axis of the retarder 22 forms an angle of 90° with the absorption axis of the second absorption polarizing plate 24. FIG. 8 shows the configuration. FIG. 8 shows illustrations for describing the configuration of the liquid crystal display device of Comparative Example 2. FIG. 8 also shows axis azimuths of optical elements between the liquid crystal panel 10 and the backlight 30. As the retarder 22, a biaxial phase difference film having a NZ factor of 1.6, an in-plane phase difference R0 of 260 nm, and a thickness direction phase difference Rth of 286 nm was used.

Figure 9:
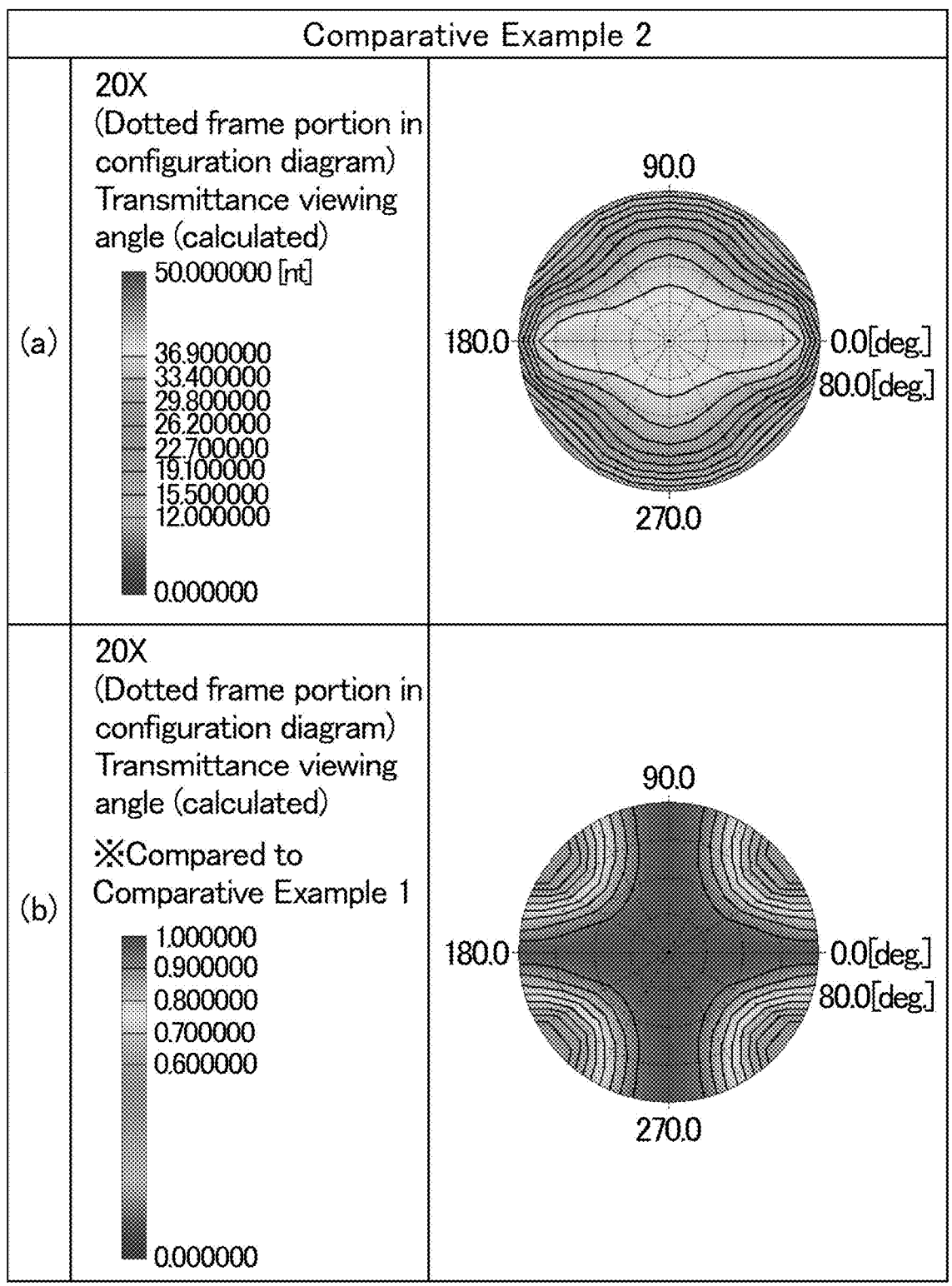
FIG. 9 shows results of calculation of a transmittance viewing angle for a portion 20X of the liquid crystal display device according to Comparative Example 2.

In a manner similar to Comparative Example 1, a transmittance viewing angle of parts closer to the back surface side than the liquid crystal panel is, that is, the portion 20X from the second absorption polarizing plate 24 to the reflection polarizing plate 23 (polarizing plate louver), was calculated. FIG. 9 shows results (section (a)). FIG. 9 also shows a chart normalized by dividing the result of the transmittance viewing angle calculated in the present comparative example by the result of Comparative Example 1 (section (b)). Table 1 shows relative transmittances at an azimuthal angle of 0°, an azimuthal angle of 45°, and an azimuthal angle 90° at a polar angle of 60° in this chart. In a manner similar to Comparative Example 1, a front luminance and a front CR were measured. Table 1 shows the results.

As shown in FIG. 9 and Table 1, in Comparative Example 2, the transmittances are small at a polar angle of 40° or more at oblique azimuths of 45°, −225°, 130°, and −315°, as compared to Comparative Example 1. This shows that the polarizing plate louver has advantages. As shown in Table 1, in Comparative Example 2, the front CR was enhanced but the front luminance remained the same as compared to Comparative Example 1. This is supposed to be because oblique light at oblique azimuths (45°, −225°, 130°, and −315°) narrowed by the polarizing plate louver was absorbed by the second absorption polarizing plate 24 and was not recycled.

Comparative Example 3

Figure 10:
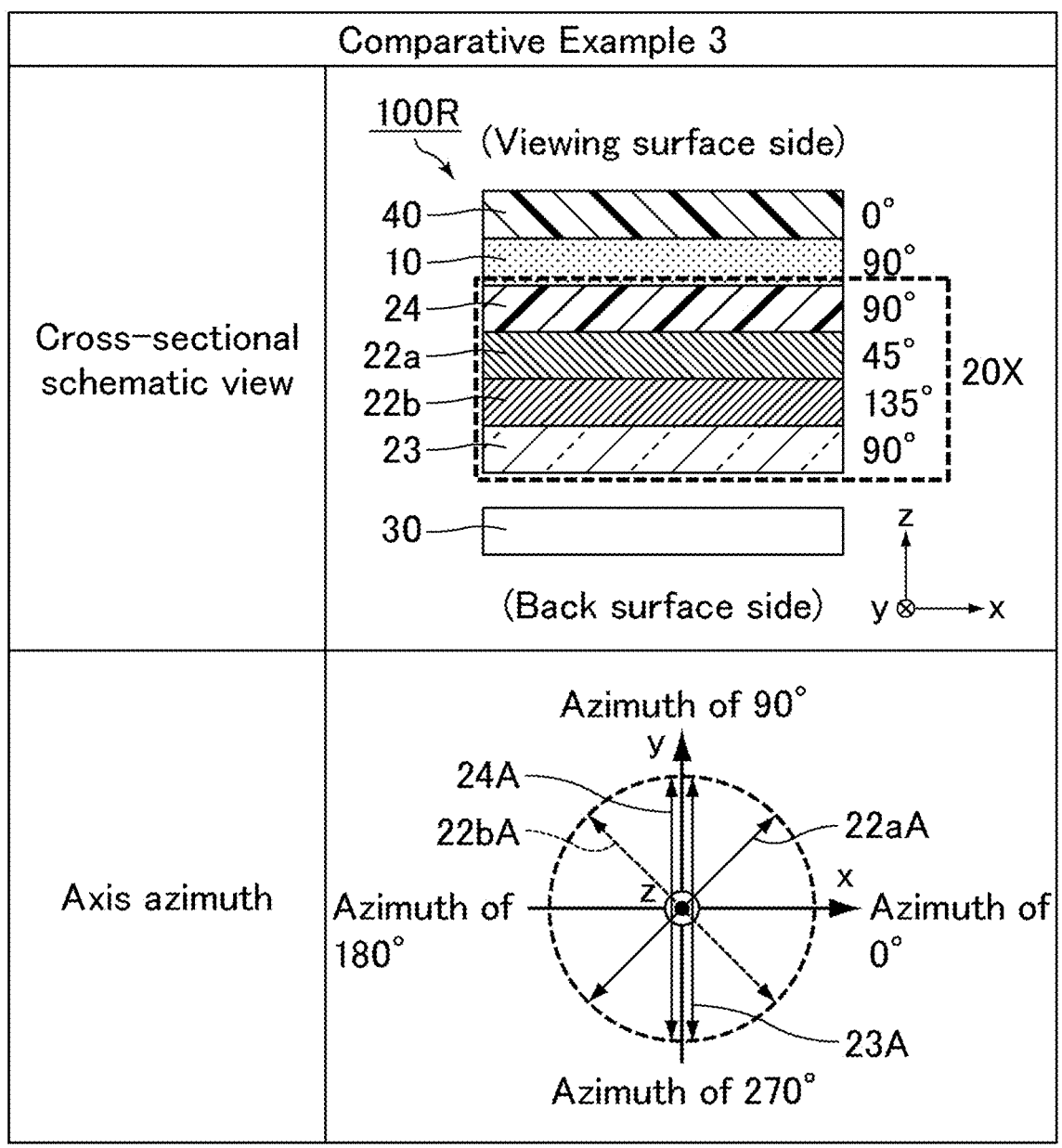
FIG. 10 shows a cross-sectional schematic view illustrating a configuration of a liquid crystal display device according to Comparative Example 3 and a conceptual diagram illustrating axis azimuths of each optical element.

A liquid crystal display device of Comparative Example 3 uses a polarizing plate louver having a larger diaphragm of oblique light than in Comparative Example 2. Specifically, the liquid crystal display device of Comparative Example 3 has the same configuration as the liquid crystal display device of Comparative Example 2 except that the first retarder 22a and the second retarder 22b are disposed from the viewing surface side between the second absorption polarizing plate 24 and the reflection polarizing plate 23. FIG. 10 shows the configuration. FIG. 10 shows illustrations for describing a configuration of the liquid crystal display device of Comparative Example 3. FIG. 10 also shows axis azimuths of optical elements between the liquid crystal panel 10 and the backlight 30. The first and second retarders 22a and 22b were disposed such that the slow axis of each of the first and second retarders 22a and 22b forms an angle of 45° with the absorption axis of the second absorption polarizing plate 24, and an angle formed by the slow axis of the first retarder 22a and the slow axis of the second retarder 22b was 90°. As the retarder, two biaxial phase difference films (first and second retarders 22a and 22b) used in Comparative Example 1 were used.

Figure 11:
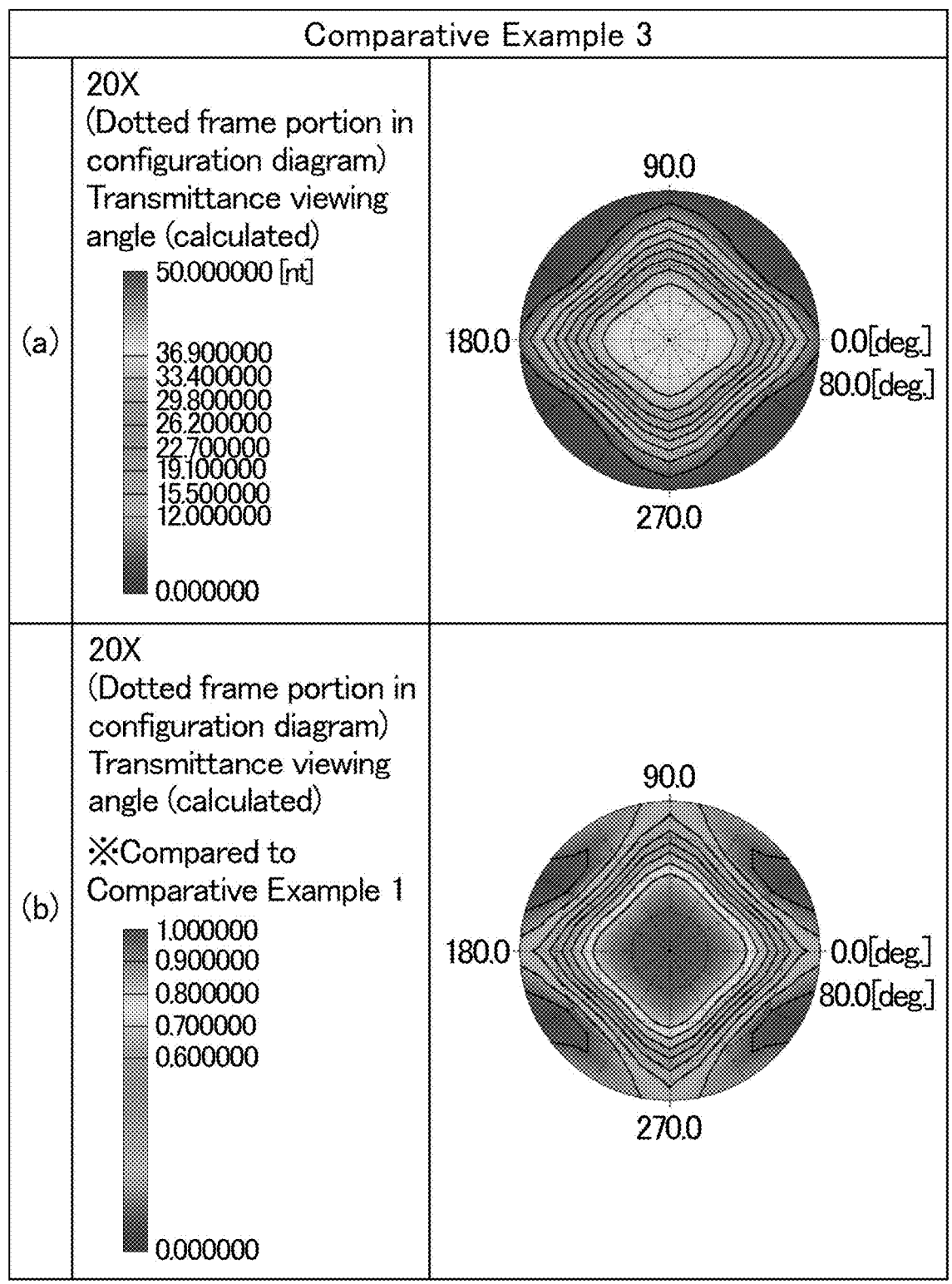
FIG. 11 shows results of calculation of a transmittance viewing angle for a portion 20X of the liquid crystal display device according to Comparative Example 3.

In a manner similar to Comparative Example 1, a transmittance viewing angle of parts closer to the back surface side than the liquid crystal panel is, that is, the portion 20X from the second absorption polarizing plate 24 to the reflection polarizing plate 23 (polarizing plate louver), was calculated. FIG. 11 shows results (section (a)). FIG. 11 also shows a chart normalized by dividing the result of the transmittance viewing angle calculated in the present example by the result of Comparative Example 1 (section (b)). Table 1 shows relative transmittances at an azimuthal angle of 0°, an azimuthal angle of 45°, and an azimuthal angle 90° at a polar angle of 60° in this chart. In a manner similar to Comparative Example 1, a front luminance and a front CR were measured. Table 1 shows the results.

As shown in FIG. 11 and Table 1, in Comparative Example 3, the transmittance is smaller than in Comparative Example 1 at all the azimuths. This shows that the polarizing plate louver (portion 20X in FIG. 10) of Comparative Example 3 has a diaphragm larger than that of the polarizing plate louver of Comparative Example 2. As shown in Table 1, in Comparative Example 3, the front CR was enhanced but the front luminance remained the same as compared to Comparative Examples 1 and 2. This is supposed to be because oblique light at oblique azimuths (45°, −225°, 130°, and −315°) narrowed by the polarizing plate louver was absorbed by the second absorption polarizing plate 24 and was not recycled, in a manner similar to Comparative Example 1.

Example 1

Figure 12:
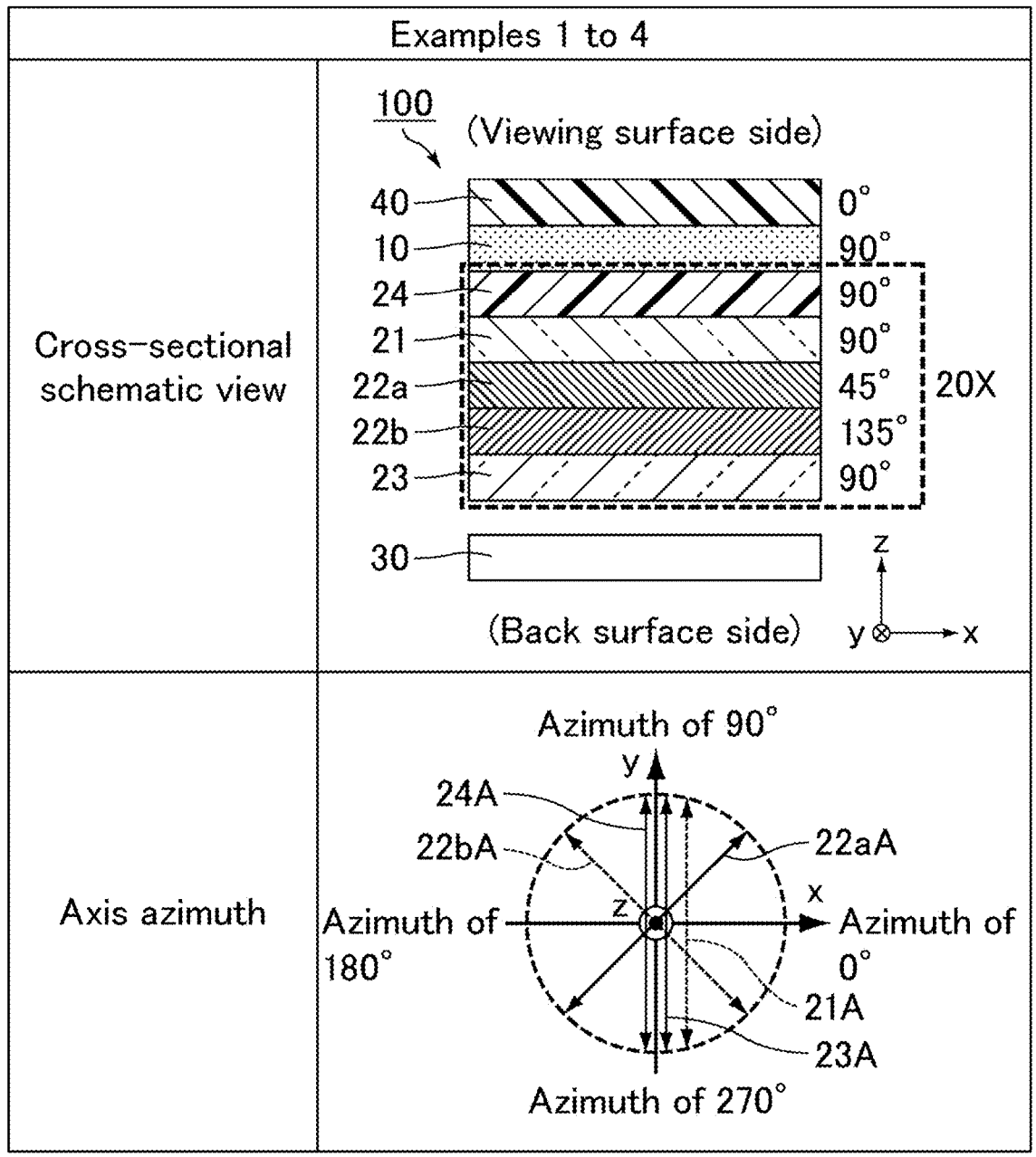
FIG. 12 shows a cross-sectional schematic view illustrating a configuration of a liquid crystal display device according to each of Examples 1 to 4 and a conceptual diagram illustrating axis azimuths of each optical element.

A liquid crystal display device of Example 1 has the same configuration as that of the liquid crystal display device of Comparative Example 3 except that a reflection polarizing plate (first reflection polarizing plate 21) was disposed between the second absorption polarizing plate 24 and the first retarder 22a. FIG. 12 shows the configuration. FIG. 12 shows illustrations for describing configurations of the liquid crystal display devices of Example 1 and Examples 2 to 4 described later. FIG. 12 also shows axis azimuths of optical elements between the liquid crystal panel 10 and the backlight 30. As the first reflection polarizing plate 21, a reflection polarizer APF available from 3M was used. The reflection polarizing plate 23 will also be referred to as the second reflection polarizing plate 23.

Figure 13:
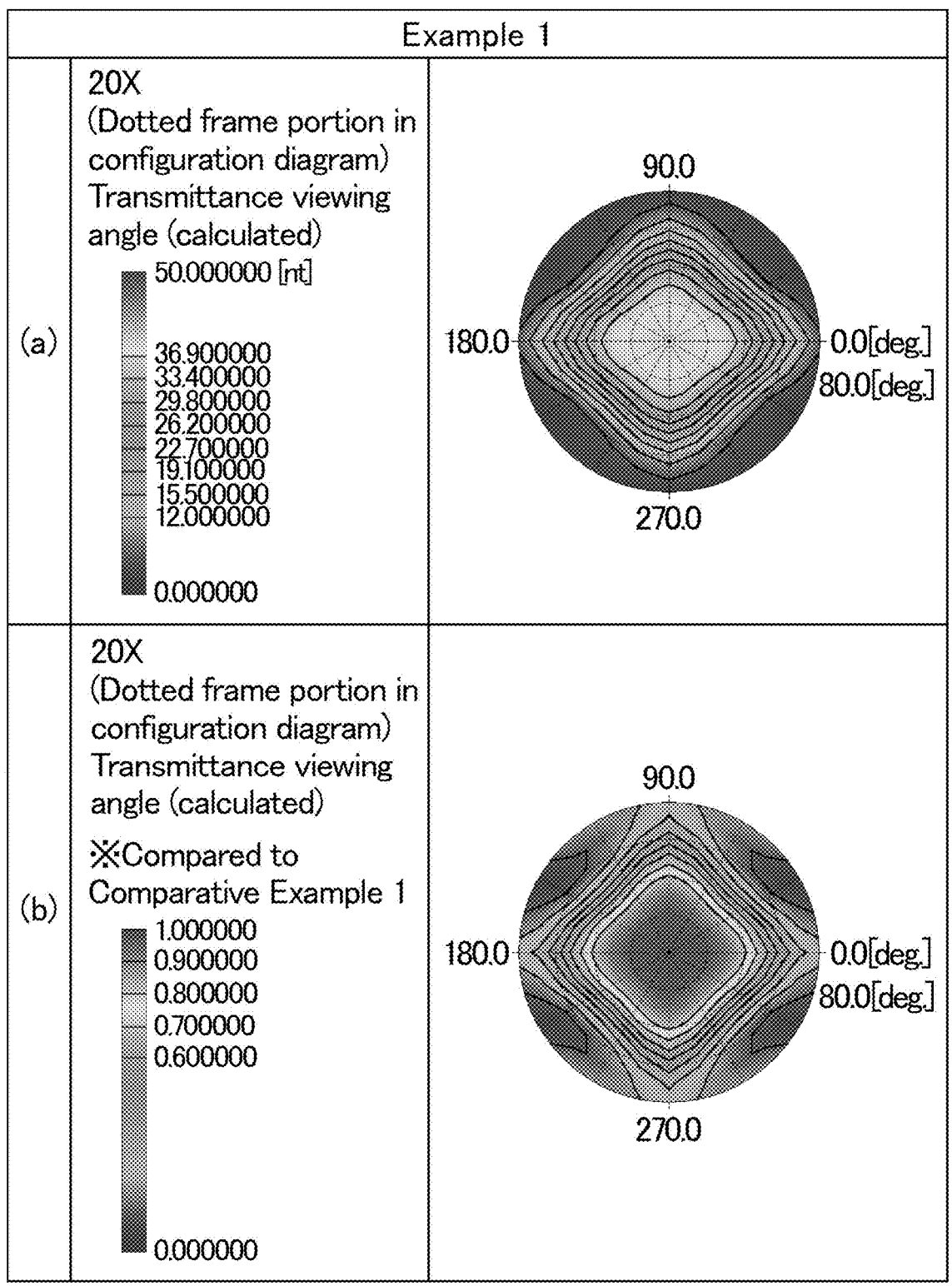
FIG. 13 shows results of calculation of a transmittance viewing angle for a portion 20X of the liquid crystal display device according to Example 1.

In a manner similar to Comparative Example 1, a transmittance viewing angle of parts closer to the back surface side than the liquid crystal panel is, that is, the portion 20X from the second absorption polarizing plate 24 to the second reflection polarizing plate 23 (polarizing plate louver), was calculated. FIG. 13 shows a calculation result in a case where each of the first and second retarders 22a and 22b has an NZ factor of 1.6, an in-plane phase difference R0 of 260 nm, and a thickness direction phase difference Rth of 286 nm (section (a)). FIG. 13 also shows a chart normalized by dividing the result of the transmittance viewing angle calculated in the present example by the result of Comparative Example 1 (section (b)). Table 1 shows relative transmittances at an azimuthal angle of 0°, an azimuthal angle of 45°, and an azimuthal angle 90° at a polar angle of 60° in this chart. In a manner similar to Comparative Example 1, a front luminance and a front CR were measured. This measurement used a configuration having an in-plane phase difference R0 of 260 nm. Table 1 shows the results.

In the calculation with the "LCD Master" used for measurement, the effect in which light is subjected to multiple reflection from the liquid crystal panel 10 toward the backlight 30 and recycled to the front direction cannot be taken into consideration, and thus, the result of the transmittance viewing angle (see FIG. 13 and Table 1) is the same as the calculation result in Comparative Example 3.

Figure 14A:
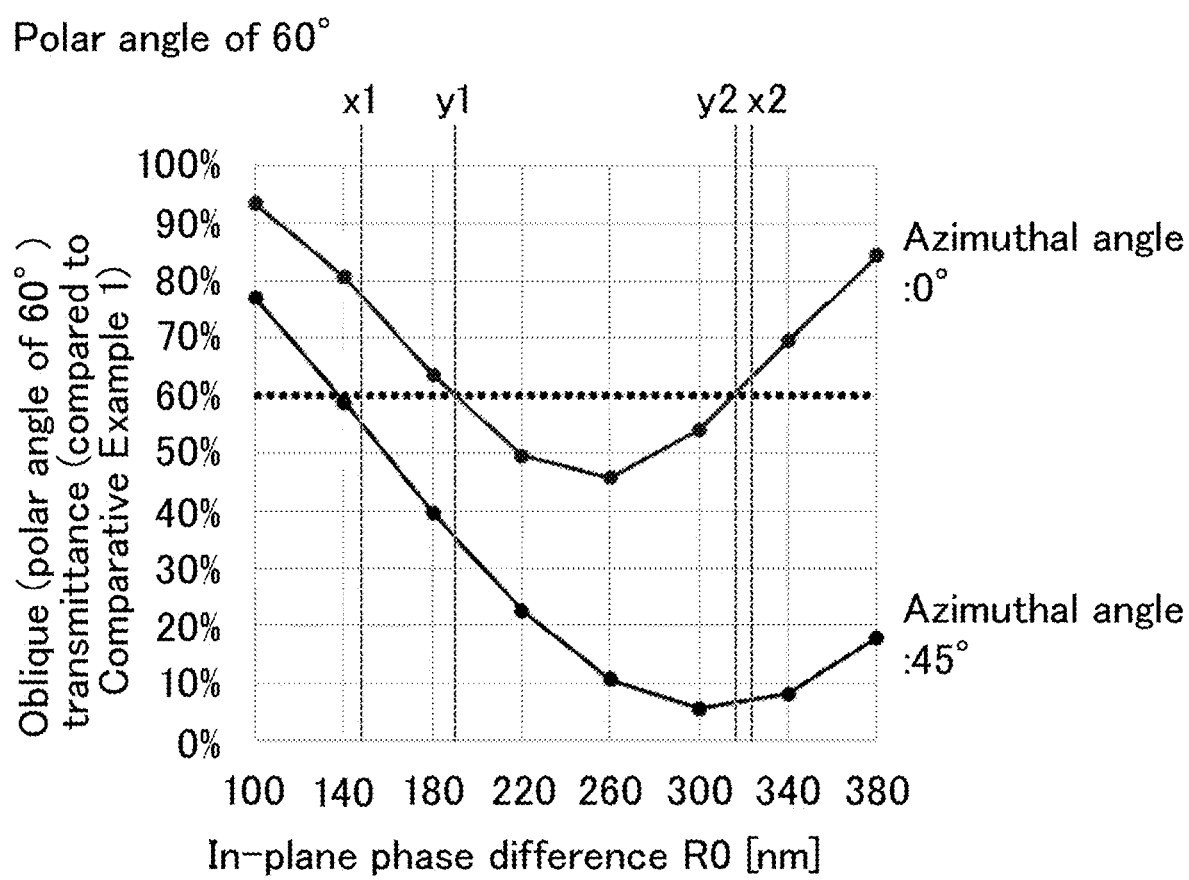
FIG. 14A shows a graph of transmittance at a polar angle of 60° (ordinate axis) versus in-plane phase difference R0 (abscissa axis), the graph showing the cases of an azimuthal angle of 0° and an azimuthal angle of 45° based on calculation results of a transmittance viewing angle for the portion 20X of the liquid crystal display device according to Example 1.
Figure 14B:
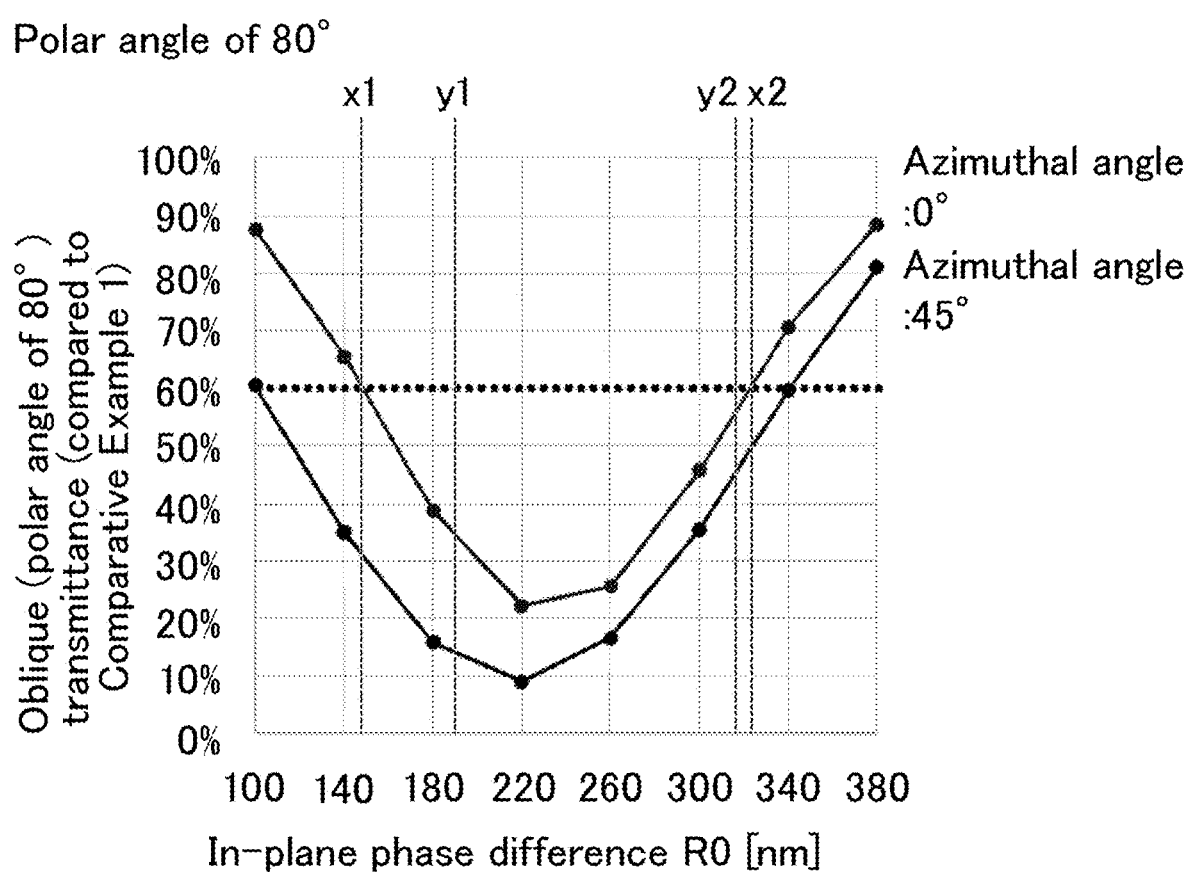
FIG. 14B shows a graph of transmittance at a polar angle of 80° (ordinate axis) versus in-plane phase difference R0 (abscissa axis), the graph showing the cases of an azimuthal angle of 0° and an azimuthal angle of 45° based on calculation results of a transmittance viewing angle for the portion 20X of the liquid crystal display device according to Example 1.

To study dependence of the transmittance on the in-plane phase difference R0, in each of the first and second retarders 22a and 22b, the NZ factor was set at 1.6 and the in-plane phase difference R0 was changed between 100 nm and 380 nm to study the transmittance. In the calculation results, FIG. 14A shows a graph of transmittance at a polar angle of 60° (ordinate axis) versus in-plane phase difference R0 (abscissa axis), and FIG. 14B shows a graph of transmittance at a polar angle of 80° (ordinate axis) versus in-plane phase difference R0 (abscissa axis), each graph showing the cases of an azimuthal angle of 0° and an azimuthal angle of 45°. In FIGS. 14A and 14B, the transmittance on the ordinate axis represents a relative value in a case where the transmittance of Comparative Example 1 is taken as 100%. The transmittance of Comparative Example 1 corresponds to a transmittance in the front direction (also referred to as a front transmittance).

FIG. 14A shows that at R0=260 nm, a transmittance at a polar angle of 60° and an azimuthal angle of 0° is at minimum. Thus, measurement of a front luminance and a front CR employed a configuration of in-plane phase difference R0=260 nm at which the transmittance at a polar angle of 60° and an azimuthal angle of 0° was at minimum. FIG. 14A shows that R0 when the transmittance is 60% at an azimuthal angle of 0° is 190 nm (y1) and 310 nm (y2). FIG. 14B shows that R0 when the transmittance is 60% at an azimuthal angle of 0° is 148 nm (x1) and 323 nm (x2). Thus, within the range of R0=190 to 310 nm (from y1 to y2), the transmittances at a polar angle of 60° or more and an azimuthal angle of 0° and an azimuthal angle of 45° are 60% or less.

Table 1 shows a result in which the front CR and the front luminance of Example 1 are both higher than those of Comparative Example 1.

Example 2

A liquid crystal display device of Example 2 has the same configuration as the liquid crystal display device of Example 1 except that the NZ factors of the first and second retardation layers 22a and 22b were changed to 1.4. FIG. 12 shows the configuration.

Figure 15:
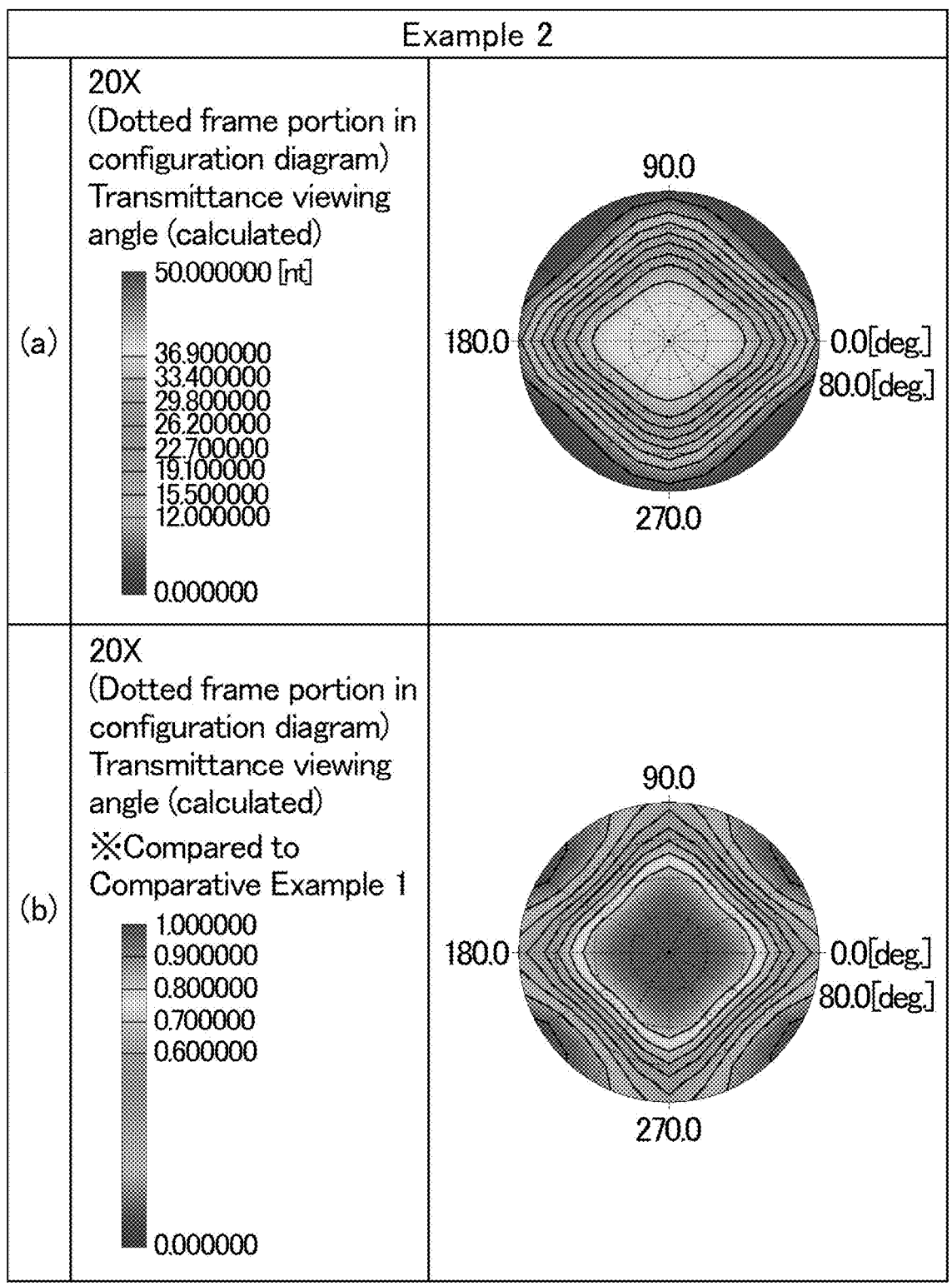
FIG. 15 show results of calculation of a transmittance viewing angle for a portion 20X of a liquid crystal display device according to Example 2.

In a manner similar to Comparative Example 1, a transmittance viewing angle of parts closer to the back surface side than the liquid crystal panel is, that is, the portion 20X from the second absorption polarizing plate 24 to the second reflection polarizing plate 23 (polarizing plate louver), was calculated. FIG. 15 shows a calculation result in a case where each of the first and second retarders 22a and 22b has an NZ factor of 1.4, an in-plane phase difference R0 of 260 nm, and a thickness direction phase difference Rth of 234 nm (section (a)). FIG. 15 also shows a chart normalized by dividing the result of the transmittance viewing angle calculated in this example by the result of Comparative Example 1 (section (b)). Table 1 shows relative transmittances at an azimuthal angle of 0°, an azimuthal angle of 45°, and an azimuthal angle 90° at a polar angle of 60° in this chart. In a manner similar to Comparative Example 1, a front luminance and a front CR were measured. This measurement used a configuration having an in-plane phase difference R0 of 260 nm. Table 1 shows the results.

Figure 16A:
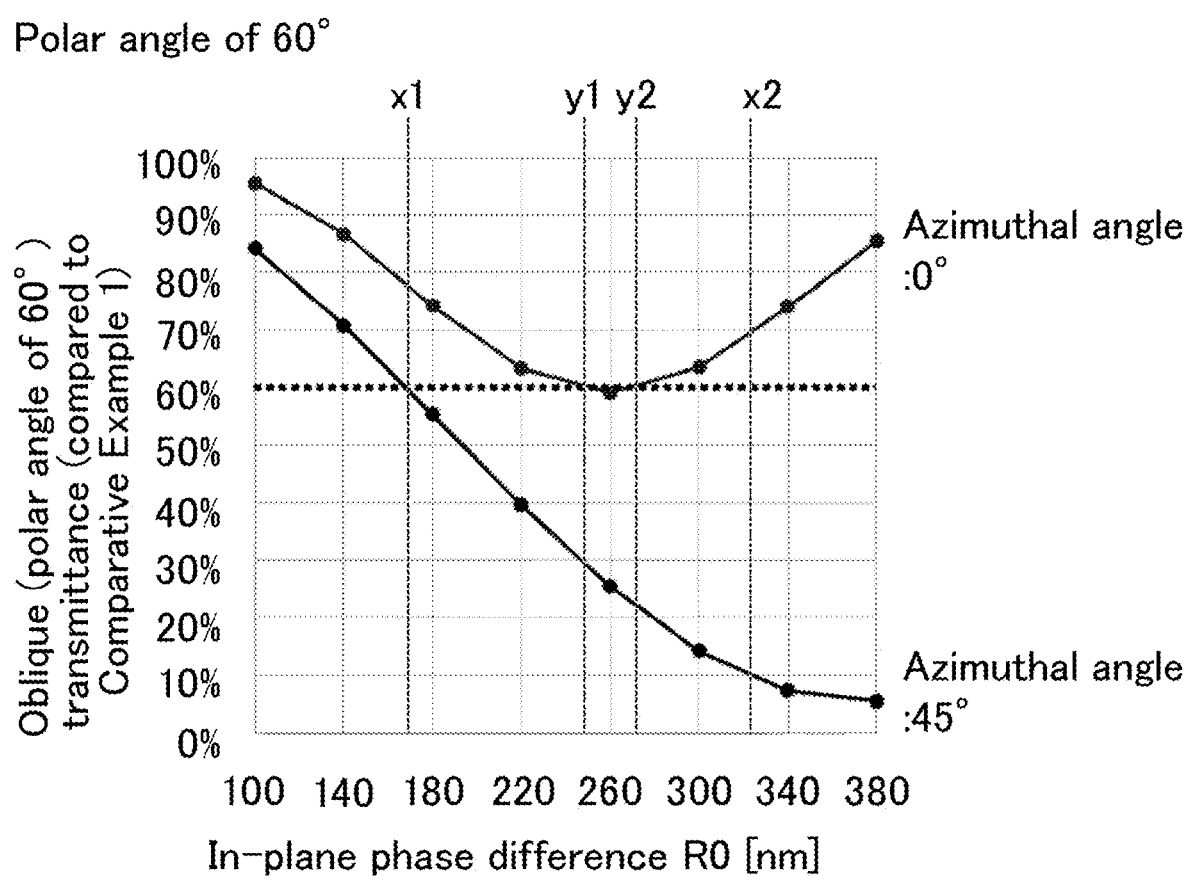
FIG. 16A shows a graph of transmittance at a polar angle of 60° (ordinate axis) versus in-plane phase difference R0 (abscissa axis), the graph showing the cases of an azimuthal angle of 0° and an azimuthal angle of 45° based on calculation results of a transmittance viewing angle for the portion 20X of the liquid crystal display device according to Example 2.
Figure 16B:
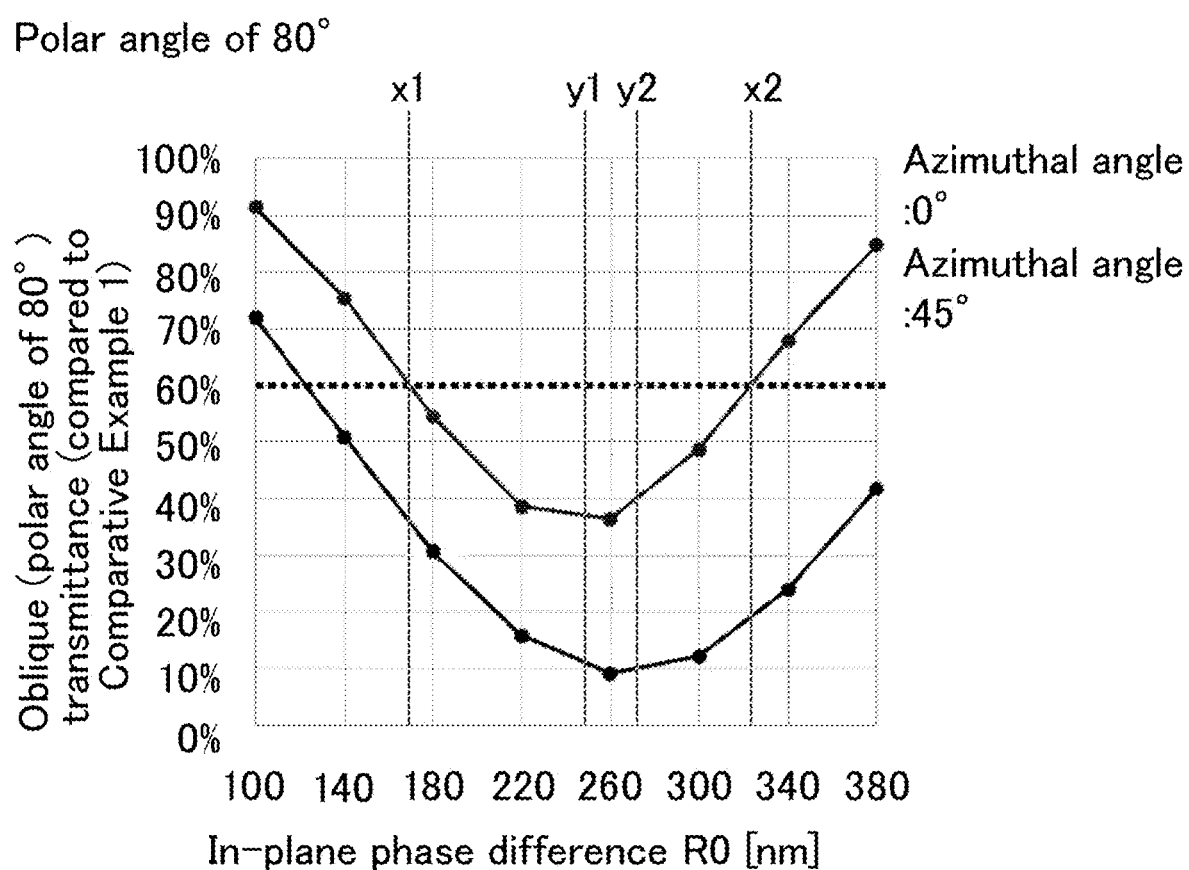
FIG. 16B shows a graph of transmittance at a polar angle of 80° (ordinate axis) versus in-plane phase difference R0 (abscissa axis), the graph showing the cases of an azimuthal angle of 0° and an azimuthal angle of 45° based on calculation results of a transmittance viewing angle for the portion 20X of the liquid crystal display device according to Example 2.

To study dependence of the transmittance on the in-plane phase difference R0, in each of the first and second retarders 22a and 22b, the NZ factor was set at 1.4 and the in-plane phase difference R0 was changed between 100 nm and 380 nm to study the transmittance. In the calculation results, FIG. 16A shows a graph of transmittance at a polar angle of 60° (ordinate axis) versus in-plane phase difference R0 (abscissa axis), and FIG. 16B shows a graph of transmittance at a polar angle of 80° (ordinate axis) versus in-plane phase difference R0 (abscissa axis), each graph showing the cases of an azimuthal angle of 0° and an azimuthal angle of 45°. In FIGS. 16A and 16B, the transmittance on the ordinate axis represents a relative value in a case where the transmittance of Comparative Example 1 is taken as 100%.

FIG. 16A shows that at R0=260 nm, a transmittance at a polar angle of 60° and an azimuthal angle of 0° is at minimum. Thus, measurement of a front luminance and a front CR employed a configuration having an in-plane phase difference R0 of 260 nm at which the transmittance at a polar angle of 60° and an azimuthal angle of 0° was at minimum. FIG. 16A shows that R0 when the transmittance is 60% at an azimuthal angle of 0° is 255 nm (y1) and 265 nm (y2). FIG. 16B shows that R0 when the transmittance is 60% at an azimuthal angle of 0° is 170 nm (x1) and 323 nm (x2). Thus, within the range of R0=255 to 265 nm (from y1 to y2), the transmittances at a polar angle of 60° or more and an azimuthal angle of 0° and an azimuthal angle of 45° are 60% or less.

Table 1 shows a result in which the front CR and the front luminance of Example 2 were both higher than those of Comparative Example 1. In consideration of the result of the transmittance viewing angle in FIG. 15 and Table 1 and the result of Example 1, when the NZ factor decreases to be less than 1.4, transmittances at an azimuth of 0°, an azimuth of 45°, and an azimuth of 90° increase, that is, the diaphragm becomes weak, and thus, the luminance enhancement effect is considered to reach a ceiling.

Example 3

A liquid crystal display device of Example 3 has the same configuration as the liquid crystal display device of Example 1 except that the NZ factors of the first and second retardation layers 22a and 22b were changed to 3.0. FIG. 12 shows the configuration.

Figure 17:
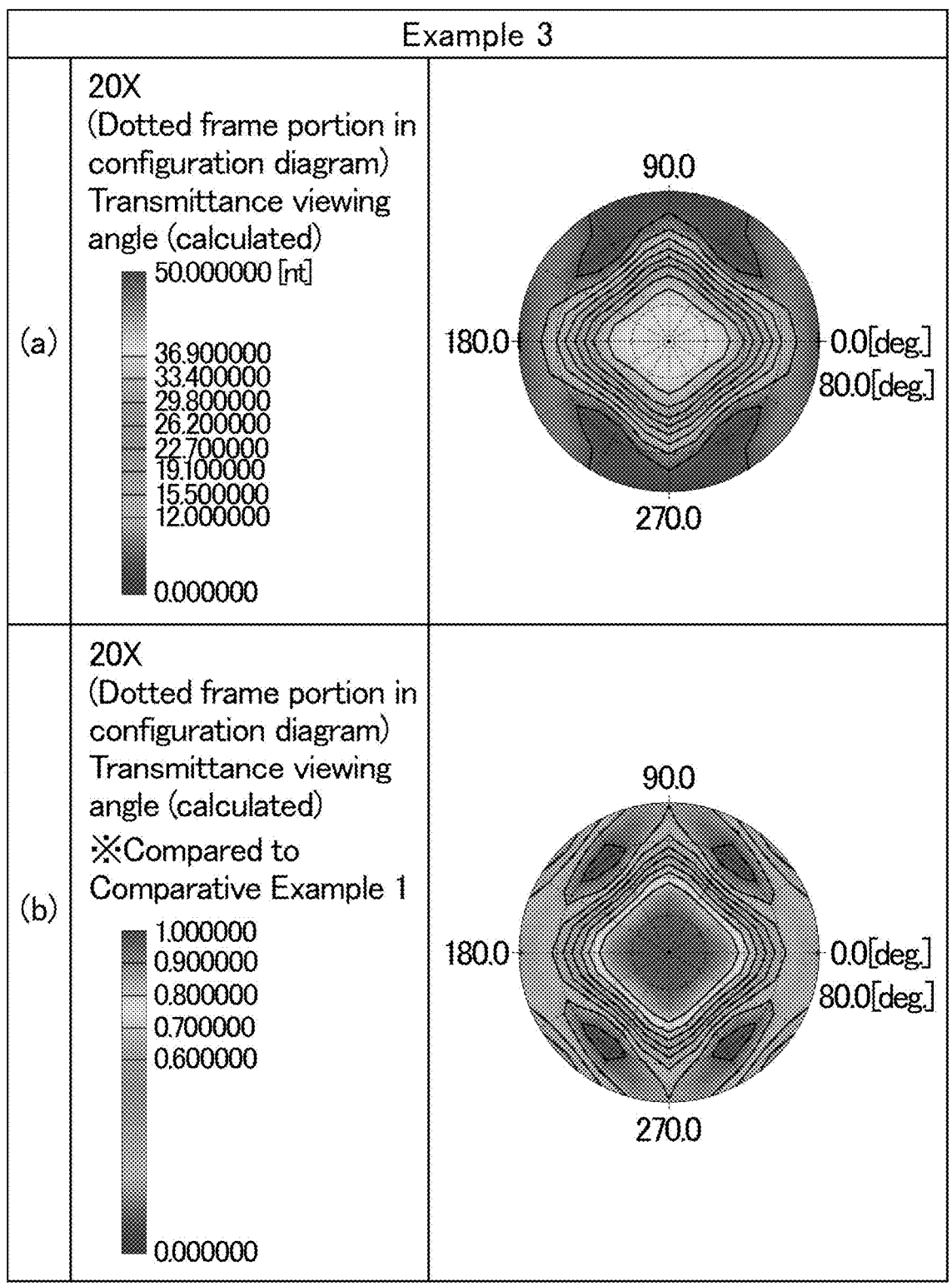
FIG. 17 shows results of calculation of a transmittance viewing angle for a portion 20X of a liquid crystal display device according to Example 3.

In a manner similar to Comparative Example 1, a transmittance viewing angle of parts closer to the back surface side than the liquid crystal panel is, that is, the portion 20X from the second absorption polarizing plate 24 to the second reflection polarizing plate 23 (polarizing plate louver), was calculated. FIG. 17 shows a calculation result in a case where each of the first and second retarders 22a and 22b has an NZ factor of 3.0, an in-plane phase difference R0 of 140 nm, and a thickness direction phase difference Rth of 350 nm (section (a)). FIG. 17 also shows a chart normalized by dividing the result of the transmittance viewing angle calculated in this example by the result of Comparative Example 1 (section (b)). Table 1 shows relative transmittances at an azimuthal angle of 0°, an azimuthal angle of 45°, and an azimuthal angle 90° at a polar angle of 60° in this chart. In a manner similar to Comparative Example 1, a front luminance and a front CR were measured. This measurement used a configuration having an in-plane phase difference R0 of 140 nm. Table 1 shows the results.

Figure 18A:
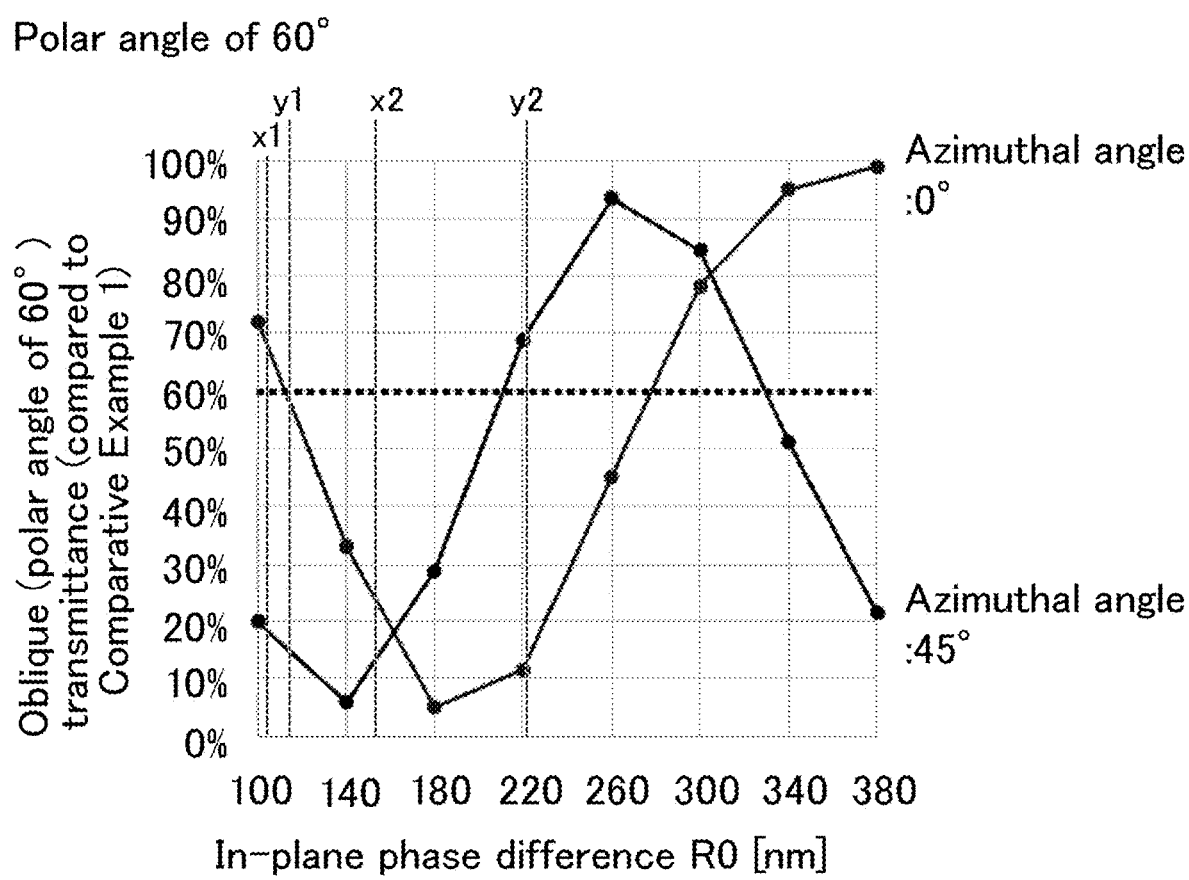
FIG. 18A shows a graph of transmittance at a polar angle of 60° (ordinate axis) versus in-plane phase difference R0 (abscissa axis), the graph showing the cases of an azimuthal angle of 0° and an azimuthal angle of 45° based on calculation results of a transmittance viewing angle for the portion 20X of the liquid crystal display device according to Example 3.
Figure 18B:
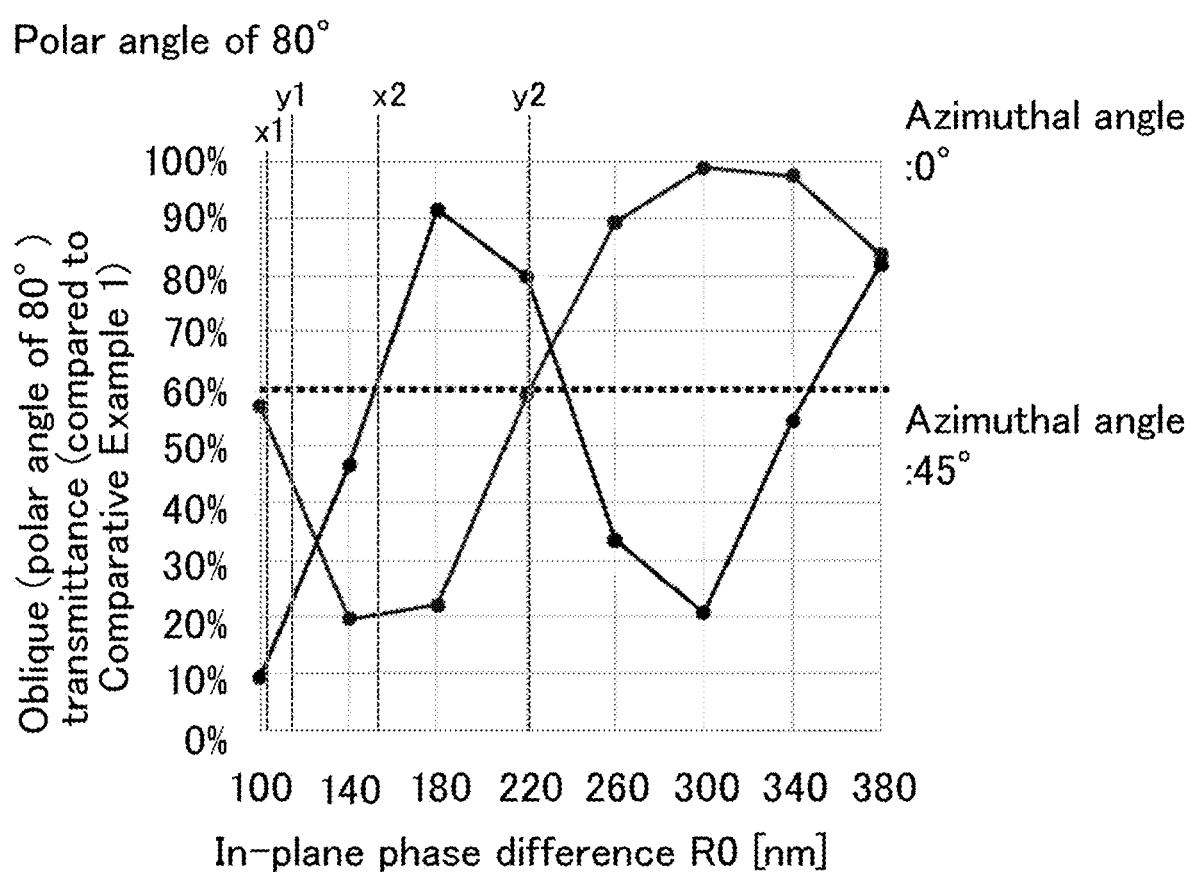
FIG. 18B shows a graph of transmittance at a polar angle of 80° (ordinate axis) versus in-plane phase difference R0 (abscissa axis), the graph showing the cases of an azimuthal angle of 0° and an azimuthal angle of 45° based on calculation results of a transmittance viewing angle for the portion 20X of the liquid crystal display device according to Example 3.

To study dependence of the transmittance on the in-plane phase difference R0, in each of the first and second retarders 22a and 22b, the NZ factor was set at 3.0 and the in-plane phase difference R0 was changed between 100 nm and 380 nm to study the transmittance. In the calculation results, FIG. 18A shows a graph of transmittance at a polar angle of 60° (ordinate axis) versus in-plane phase difference R0 (abscissa axis), and FIG. 18B shows a graph of transmittance at a polar angle of 80° (ordinate axis) versus in-plane phase difference R0 (abscissa axis), each graph showing the cases of an azimuthal angle of 0° and an azimuthal angle of 45°. In FIGS. 18A and 18B, the transmission axis on the ordinate axis represents a relative value in a case where the transmittance of Comparative Example 1 is taken as 100%.

FIG. 18A shows that at R0=140 nm, a transmittance at a polar angle of 60° and an azimuthal angle of 45° is at minimum. Thus, measurement of a front luminance and a front CR employed a configuration having an in-plane phase difference R0 of 140 nm at which the transmittance at a polar angle of 60° and an azimuthal angle of 45° was at minimum. FIG. 18A shows that R0 when the transmittance is 60% at an azimuthal angle of 0° is 115 nm (y1). FIG. 18B shows that R0 when the transmittance is 60% at an azimuthal angle of 0° is 100 nm (x1) and 225 nm (y2) that are measurement lower limits, and R0 when the transmittance is 60% at an azimuthal angle of 45° is 150 nm (x2). Thus, within the range of R0=115 to 150 nm (from y1 to x2), the transmittances at a polar angle of 60° or more and an azimuthal angle of 0° and an azimuthal angle of 45° are 60% or less.

Table 1 shows a result in which the front CR and the front luminance of Example 3 are both higher than those of Comparative Example 1.

Example 4

A liquid crystal display device of Example 4 has the same configuration as the liquid crystal display device of Example 1 except that the NZ factors of the first and second retardation layers 22a and 22b were changed to 4.0. FIG. 12 shows the configuration.

Figure 19:
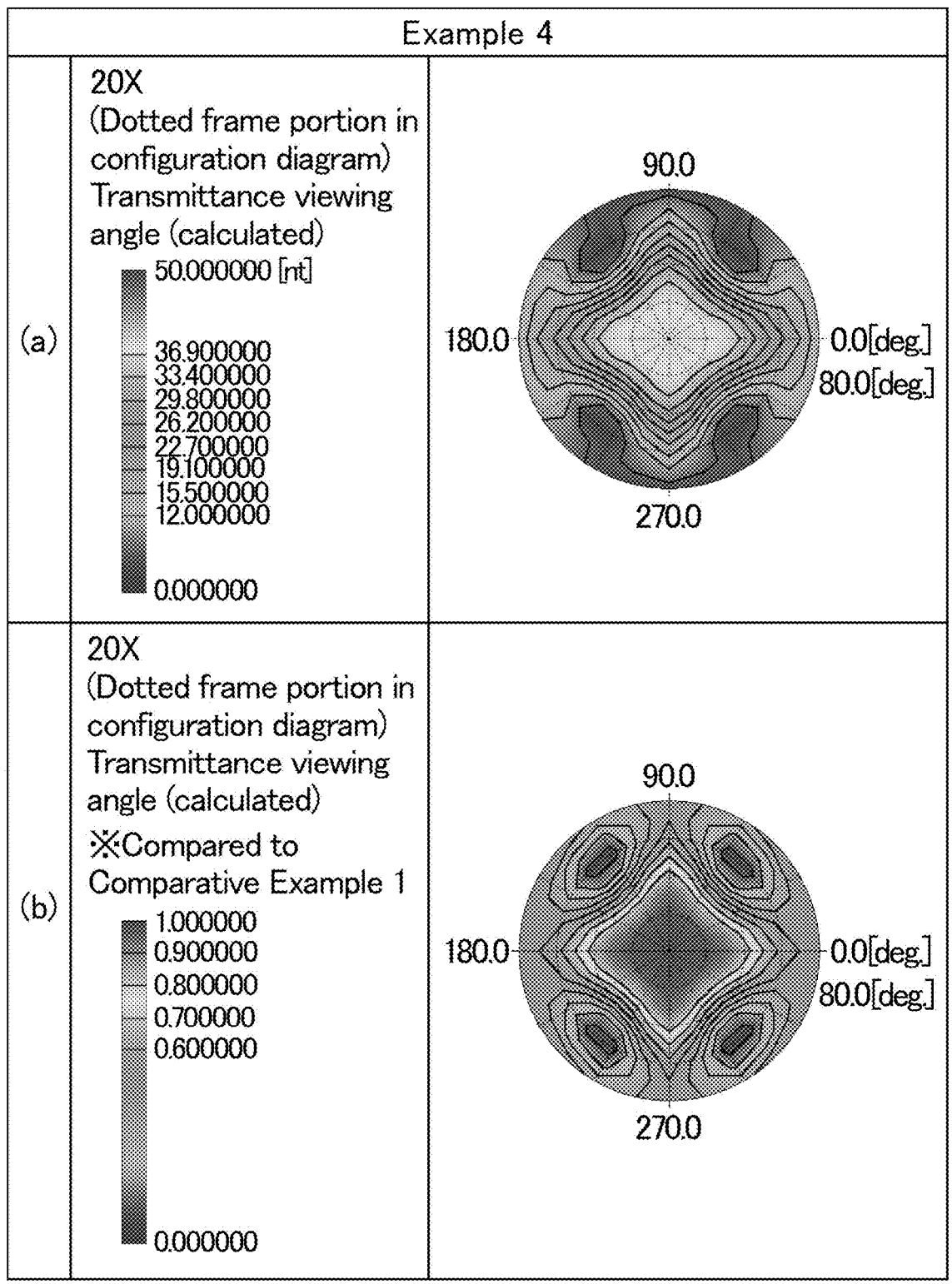
FIG. 19 shows results of calculation of a transmittance viewing angle for a portion 20X of a liquid crystal display device according to Example 4.

In a manner similar to Comparative Example 1, a transmittance viewing angle of parts closer to the back surface side than the liquid crystal panel is, that is, the portion 20X from the second absorption polarizing plate 24 to the second reflection polarizing plate 23 (polarizing plate louver), was calculated. FIG. 19 shows a calculation result in a case where each of the first and second retarders 22a and 22b has an NZ factor of 4.0, an in-plane phase difference R0 of 100 nm, and a thickness direction phase difference Rth of 350 nm (section (a)). FIG. 19 also shows a chart normalized by dividing the result of the transmittance viewing angle calculated in the present example by the result of Comparative Example 1 (section (b)). Table 1 shows relative transmittances at an azimuthal angle of 0°, an azimuthal angle of 45°, and an azimuthal angle 90° at a polar angle of 60° in this chart. In a manner similar to Comparative Example 1, a front luminance and a front CR were measured. This measurement used a configuration having an in-plane phase difference R0 of 100 nm. Table 1 shows the results.

Figure 20A:
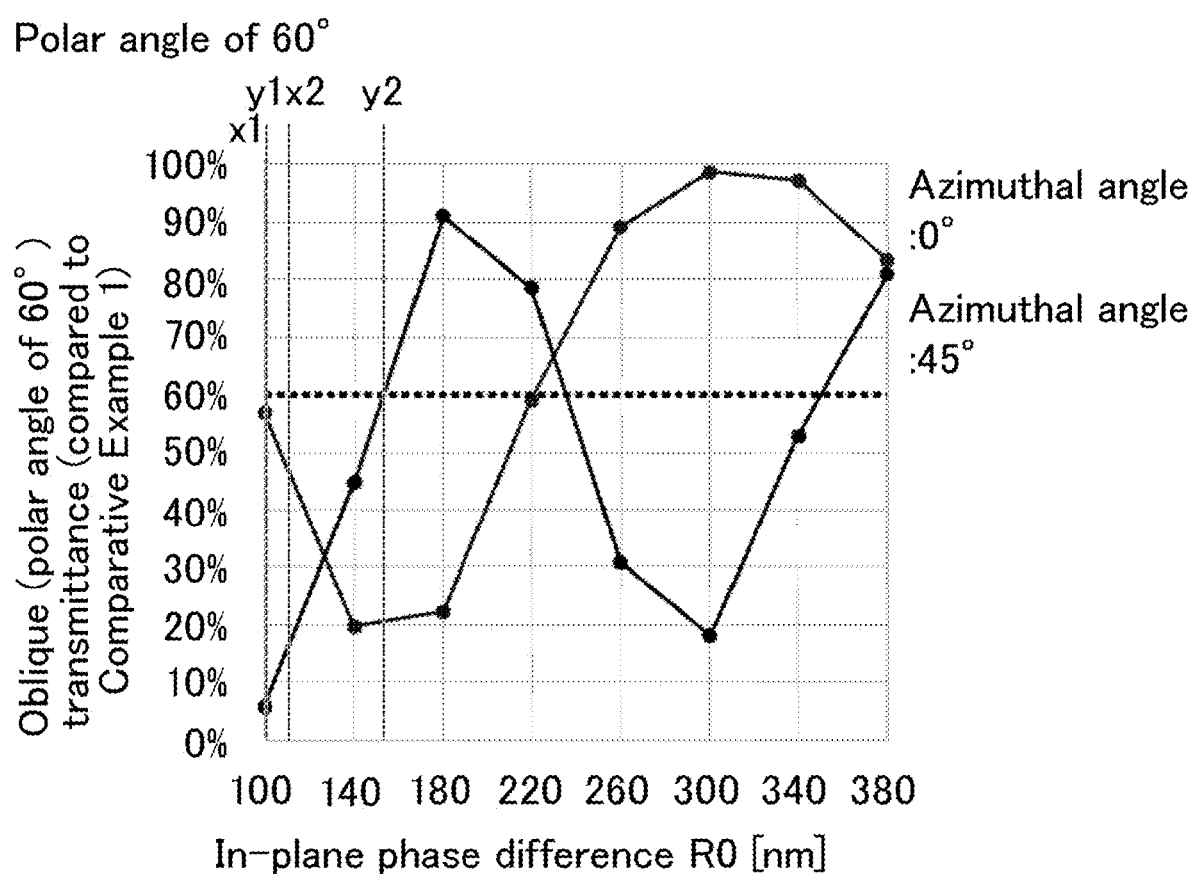
FIG. 20A shows a graph of transmittance at a polar angle of 60° (ordinate axis) versus in-plane phase difference R0 (abscissa axis), the graph showing the cases of an azimuthal angle of 0° and an azimuthal angle of 45° based on calculation results of a transmittance viewing angle for the portion 20X of the liquid crystal display device according to Example 4.
Figure 20B:
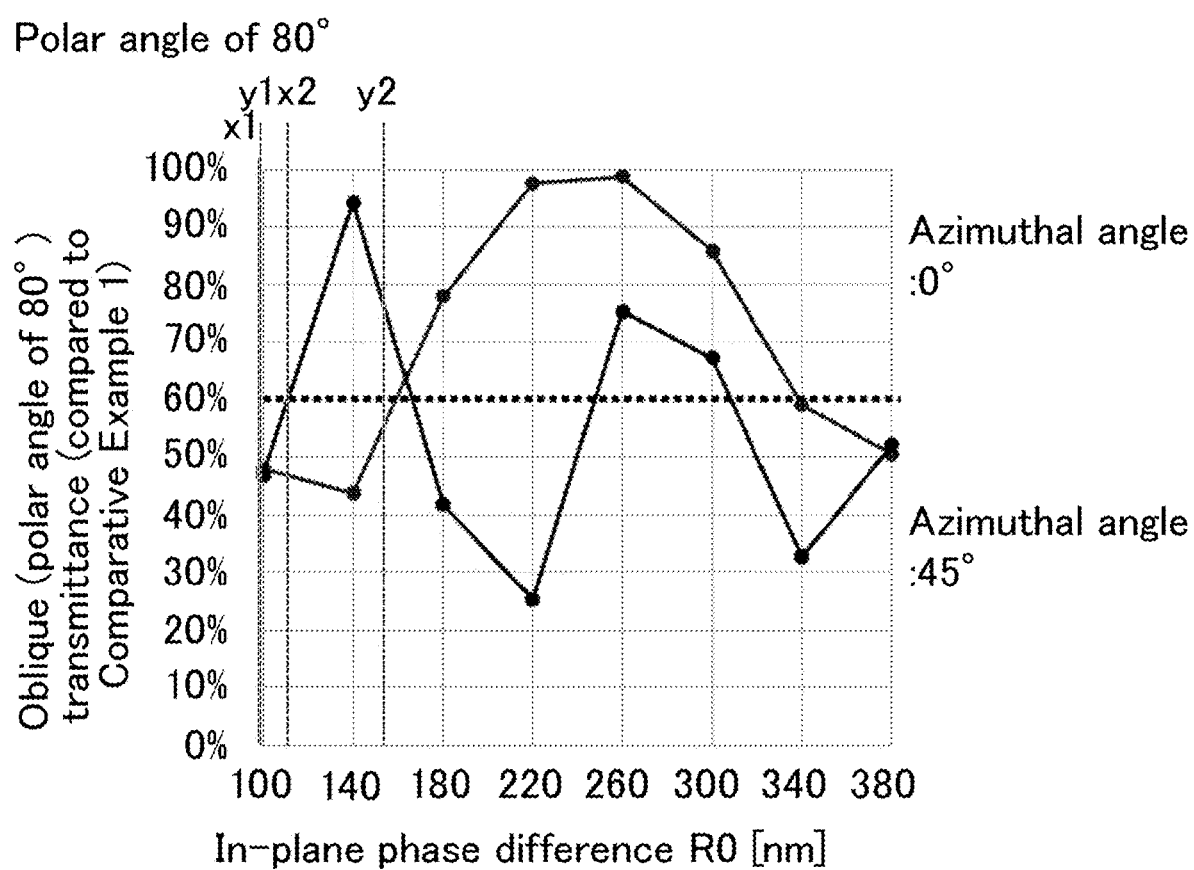
FIG. 20B shows a graph of transmittance at a polar angle of 80° (ordinate axis) versus in-plane phase difference R0 (abscissa axis), the graph showing the cases of an azimuthal angle of 0° and an azimuthal angle of 45° based on calculation results of a transmittance viewing angle for the portion 20X of the liquid crystal display device according to Example 4.

To study dependence of the transmittance on the in-plane phase difference R0, in each of the first and second retarders 22a and 22b, the NZ factor was set at 4.0 and the in-plane phase difference R0 was changed between 100 nm and 380 nm to study the transmittance. In the calculation results, FIG. 20A shows a graph of transmittances at an azimuthal angle of 0° and an azimuthal angle of 45° in which the ordinate represents transmittance at a polar angle of 60° and the abscissa represents the in-plane phase difference R0, and FIG. 20B shows a graph of transmittances at an azimuthal angle of 0° and an azimuthal angle of 45° at a polar angle of 80° in which the ordinate represents transmittance at a polar angle of 80° and the abscissa represents the in-plane phase difference R0. In FIGS. 20A and 20B, the transmittance on the ordinate axis represents a relative value in a case where the transmittance of Comparative Example 1 is 100%.

FIG. 20A shows that at R0=100 nm, a transmittance at a polar angle of 60° and an azimuthal angle of 45° is at minimum. Thus, measurement of a front luminance and a front CR employed a configuration having an in-plane phase difference R0 of 140 nm at which the transmittance at a polar angle of 60° and an azimuthal angle of 45° was at minimum. FIG. 20A shows that R0 when the transmittance is 60% at an azimuthal angle of 0° (and 45°) is 100 nm (y1) and 153 nm (y2) that are measurement lower limits. FIG. 20B shows that R0 when the transmittance is 60% at an azimuthal angle of 0° (and 45°) is 100 nm (x1) and 110 nm (x2) that are measurement lower limits. Thus, within the range of R0=100 to 110 nm (y1 (=x1) to x2), the transmittances at a polar angle of 60° or more and an azimuthal angle of 0° and an azimuthal angle of 45° are 60% or less.

Table 1 shows a result in which the front CR and the front luminance of Example 4 are both higher than those of Comparative Example 1. In consideration of the result of the transmittance viewing angle in FIG. 19 and Table 1 and the result of Example 3, when the NZ factor increases to be 4.0 or more, transmittances at an azimuth of 0°, an azimuth of 45°, and an azimuth of 90° increase, that is, the diaphragm becomes weak, and thus, the luminance enhancement effect is considered to reach a ceiling.

Reference Example 1

Figure 21:
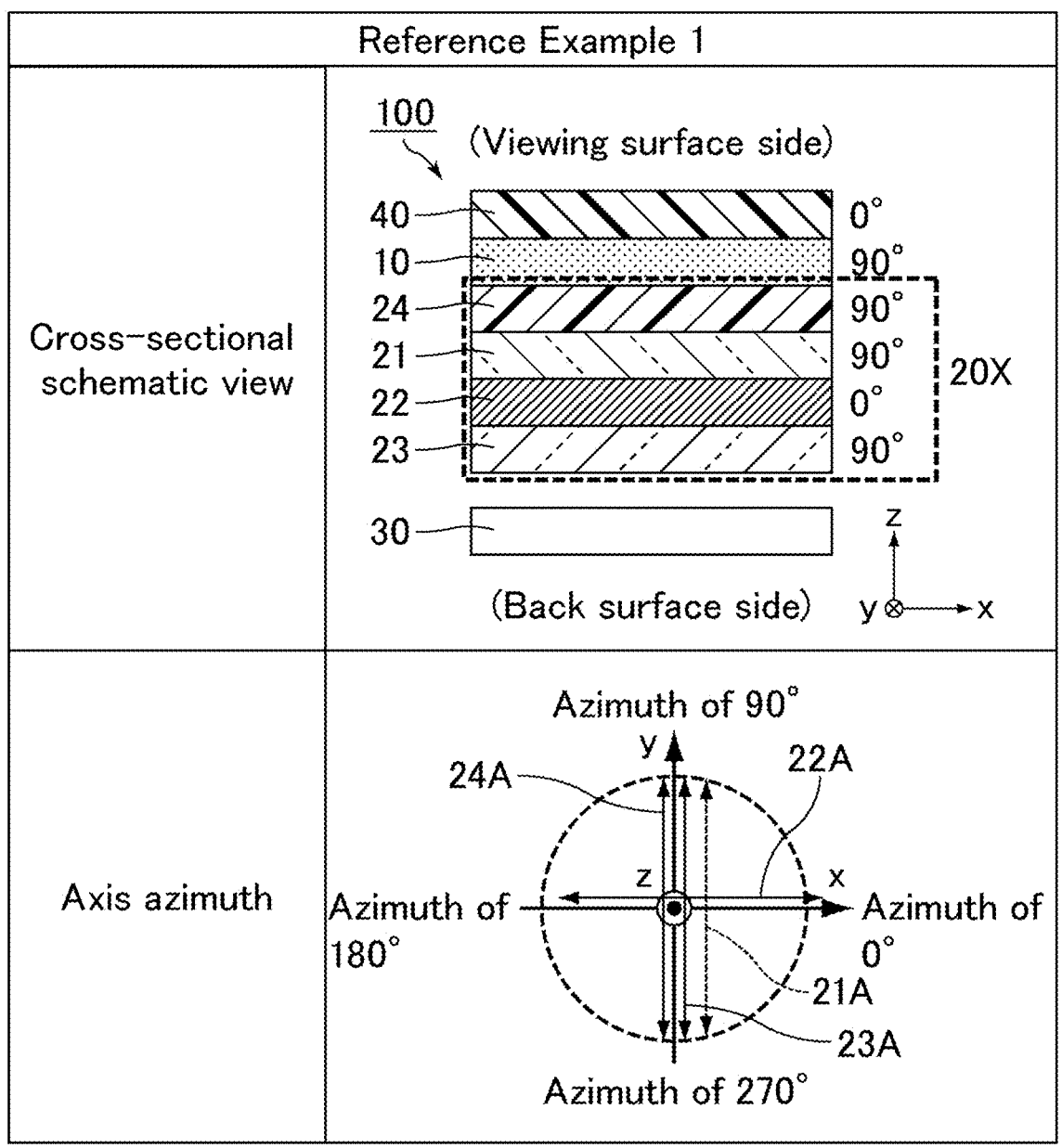
FIG. 21 shows a cross-sectional schematic view illustrating a configuration of a liquid crystal display device according to Reference Example 1 and a conceptual diagram illustrating axis azimuths of each optical element.

A liquid crystal display device of Reference Example 1 has the same configuration as the liquid crystal display device of Comparative Example 2 except that a reflection polarizing plate (first reflection polarizing plate 21) was disposed between the second absorption polarizing plate 24 and the retarder 22 such that the reflection axis of the reflection polarizing plate was parallel to the absorption axis of the second absorption polarizing plate 24. FIG. 21 shows the configuration. FIG. 21 shows illustrations for describing a configuration of the liquid crystal display device of Reference Example 1. FIG. 21 also shows axis azimuths of optical elements between the liquid crystal panel 10 and the backlight 30. As the first reflection polarizing plate 21, a reflection polarizer APF available from 3M was used. The reflection polarizing plate 23 will also be referred to as the second reflection polarizing plate 23.

Figure 22:
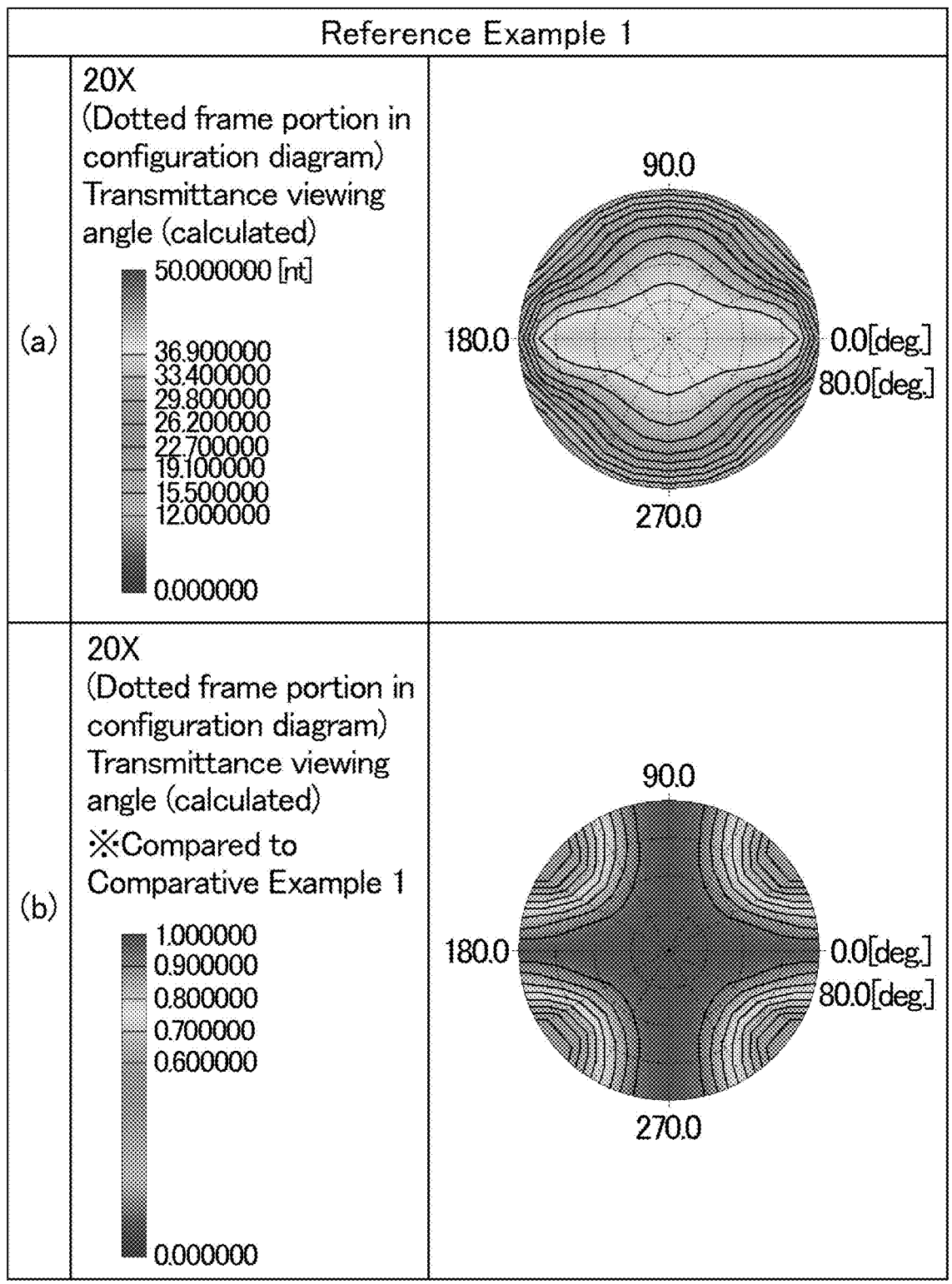
FIG. 22 shows results of calculation of a transmittance viewing angle for a portion 20X of the liquid crystal display device according to Reference Example 1.

In a manner similar to Comparative Example 1, a transmittance viewing angle of parts closer to the back surface side than the liquid crystal panel is, that is, the portion 20X from the second absorption polarizing plate 24 to the second reflection polarizing plate 23 (polarizing plate louver), was calculated. FIG. 22 shows results (section (a)). FIG. 22 also shows a chart normalized by dividing the result of the transmittance viewing angle calculated in the present example by the result of Comparative Example 1 (section (b)). Table 1 shows relative transmittances at an azimuthal angle of 0°, an azimuthal angle of 45°, and an azimuthal angle 90° at a polar angle of 60° in this chart. In a manner similar to Comparative Example 1, a front luminance and a front CR were measured. Table 1 shows the results.

The present example is intended to provide the liquid crystal display device with the configuration illustrated in FIG. 21 so that oblique light at oblique azimuths (45°, −225°, 130°, and −315°) absorbed by the second absorption polarizing plate 24 in the configuration of Comparative Example 2 was thereby reflected by the newly disposed first reflection polarizing plate 21 and repeatedly reflected between the first reflection polarizing plate 21 and the backlight 30 to be partially emitted to the front direction again. In the calculation with the "LCD Master" used for measurement, the effect in which light is subjected to multiple reflection from the liquid crystal panel 10 toward the backlight 30 and recycled to the front direction cannot be taken into consideration, and thus, the result of the transmittance viewing angle (FIG. 22 and Table 1) is the same as the calculation result in Comparative Example 2.

Table 1 shows a result in which the front CR and the front luminance of Reference Example 1 are both higher than those of Comparative Example 1. However, this enhancement effect is smaller than those of Examples 1 1 to 4

Reference Example 2

Figure 23:
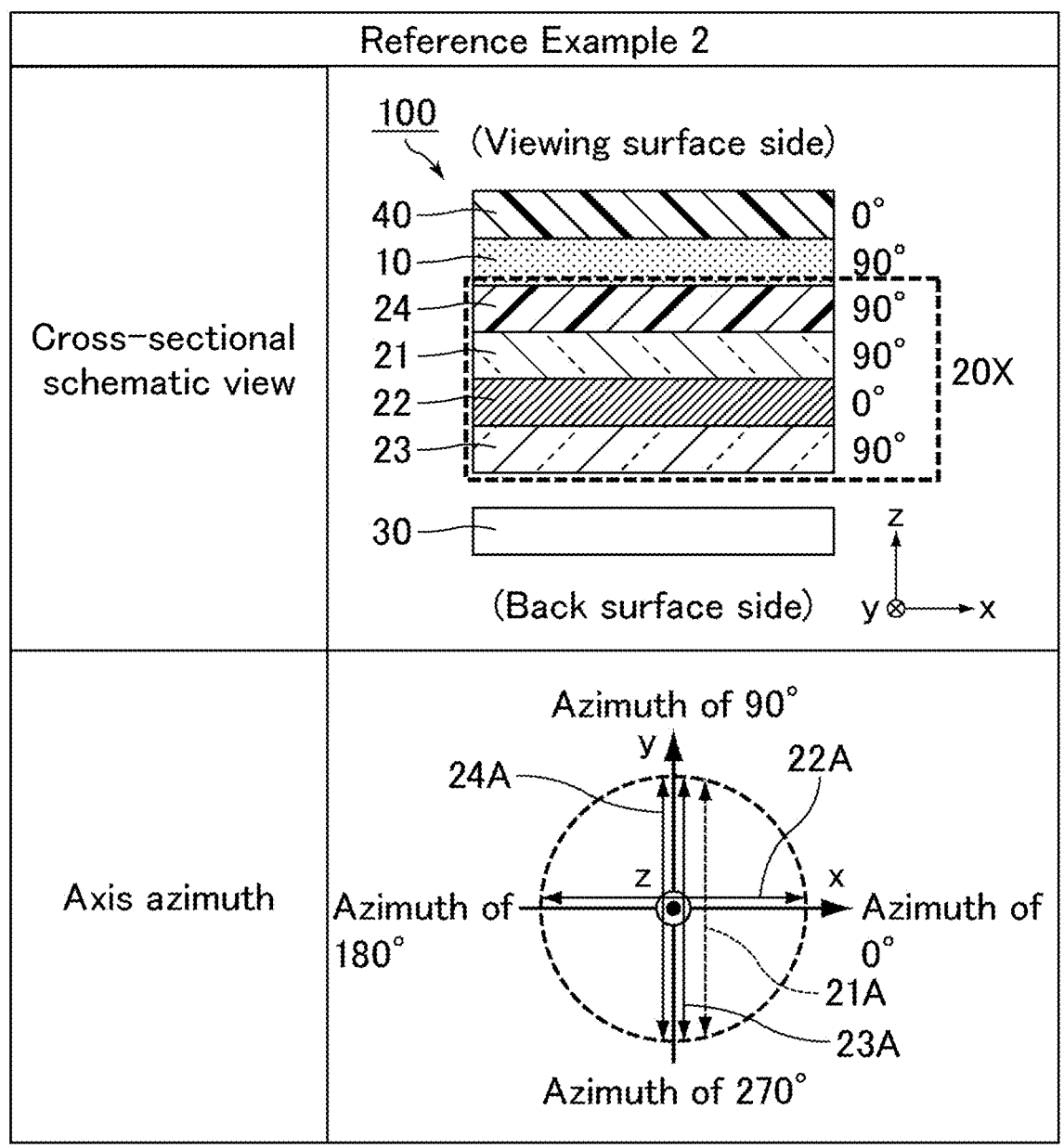
FIG. 23 shows a cross-sectional schematic view illustrating a configuration of a liquid crystal display device according to Reference Example 2 and a conceptual diagram illustrating axis azimuths of each optical element.

A liquid crystal display device of Reference Example 2 has the same configuration as the liquid crystal display device of Reference Example 1 except that a biaxial phase difference film having an NZ factor of 10, an in-plane phase difference R0 of 50 nm, and a thickness direction phase difference Rth of 475 nm was used as the retardation layer 22. FIG. 23 shows the configuration. FIG. 23 shows illustrations for describing a configuration of the liquid crystal display device of Reference Example 2. FIG. 23 also shows axis azimuths of optical elements between the liquid crystal panel 10 and the backlight 30.

Figure 24:
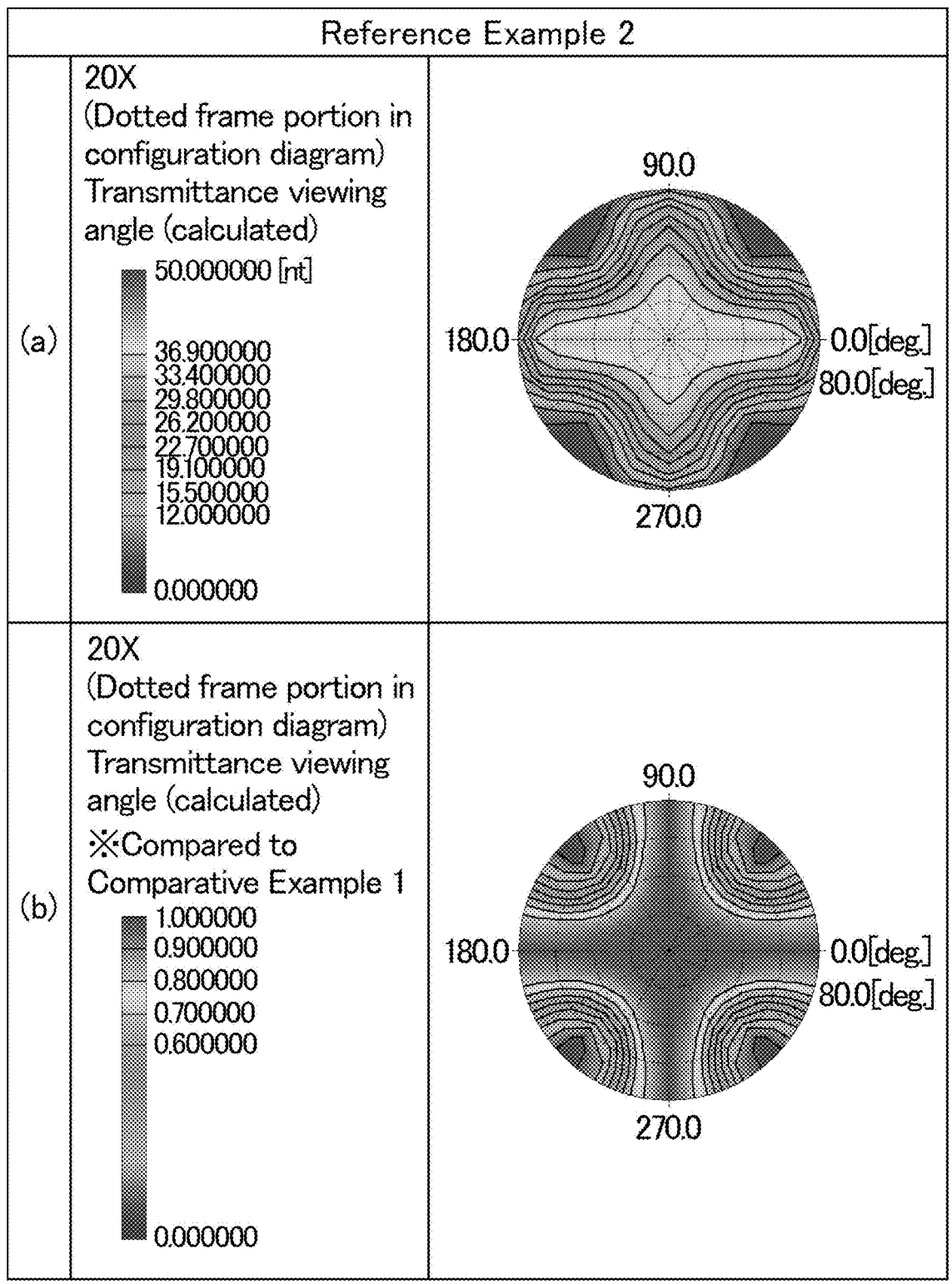
FIG. 24 shows results of calculation of a transmittance viewing angle for a portion 20X of the liquid crystal display device according to Reference Example 2.

In a manner similar to Comparative Example 1, a transmittance viewing angle of parts closer to the back surface side than the liquid crystal panel is, that is, the portion 20X from the second absorption polarizing plate 24 to the second reflection polarizing plate 23 (polarizing plate louver), was calculated. FIG. 24 shows results (section (a)). FIG. 24 also shows a chart normalized by dividing the result of the transmittance viewing angle calculated in the present example by the result of Comparative Example 1 (section (b)). Table 1 shows relative transmittances at an azimuthal angle of 0°, an azimuthal angle of 45°, and an azimuthal angle 90° at a polar angle of 60° in this chart. In a manner similar to Comparative Example 1, a front luminance and a front CR were measured. Table 1 shows the results.

As shown in FIG. 24 and Table 1, in Reference Example 2, oblique light at oblique azimuths (45°, −225°, 130°, and −315°) are narrowed as compared to Reference Example 1, but the oblique light in orientations of 0°, 180°, 90°, and −270° is not narrowed at all.

Table 1 shows a result in which the front CR and the front luminance of Reference Example 2 are both higher than those of Comparative Example 1. However, this enhancement effect is smaller than those of Examples 1 to 4.

TABLE 1

| | | Comparative Example 1 | Comparative Example 2 | Comparative Example 3 | Example 1 | Example 2 | Example 3 | Example 4 | Reference Example 1 | Reference Example 2 |
|---|---|---|---|---|---|---|---|---|---|---|
| Oblique transmittance at polar angle of 60° *Compared to Comparative Example 1 [%] | Azimuth of 0° | 100 | 100 | 46 | 46 | 59 | 33 | 57 | 100 | 100 |
| | Azimuth of 45° | 100 | 66 | 11 | 11 | 25 | 6 | 6 | 66 | 18 |
| | Azimuth of 90° | 100 | 100 | 46 | 46 | 59 | 33 | 57 | 100 | 100 |
| Front luminance [cd/m$^2$] (measured value) | | 500 | 500 | 500 | 600 | 554 | 615 | 539 | 505 | 515 |
| Front CR (measured value) | | 630 | 700 | 750 | 700 | 668 | 711 | 658 | 640 | 641 |

The aspects of the present invention described above may be appropriately combined without departing from the gist of the present invention.

REFERENCE SIGNS LIST 10, 10P: Liquid crystal panel
20: Optical element
20X: Parts closer to back surface side than liquid crystal panel is
21: First polarizer, (first) reflection polarizer, (first) reflection polarizing plate
22: Retardation layer, retarder
22a: (First) retardation layer, (first) retarder
22b: (Second) retardation layer, (second) retarder
23: Second polarizer, (second) reflection polarizer, (second) reflection polarizing plate
24: (Second) absorption polarizer, (second) absorption polarizing plate
21A, 22A, 22aA, 22bA, 23A, 24A: Absorption axis or reflection axis of polarizer, or slow axis of retardation layer
30: Backlight
40: (First) absorption polarizer, (first) absorption polarizing plate
100, 100R: Liquid crystal display device
1000: Head-mounted display
U: User

What is claimed is:

1. A liquid crystal display device comprising:
a liquid crystal panel;
an optical element; and
a backlight, the liquid crystal panel, the optical element, and the backlight being arranged in this order from a viewing surface side,
wherein the optical element includes a first polarizer, a retardation layer, and a second polarizer,
the first polarizer, the retardation layer, and the second polarizer are arranged in this order from the viewing surface side,
the first polarizer and the second polarizer are reflection polarizers,
a reflection axis of the first polarizer and a reflection axis of the second polarizer are parallel to each other, and
in oblique directions at an azimuth of 0°, an azimuth of 45°, and an azimuth of 90° at a polar angle of 60°, a polarization state of light incident on the first polarizer is elliptical polarization.

2. The liquid crystal display device according to claim 1, wherein the optical element further includes an absorption polarizer,
the absorption polarizer is disposed on a viewing surface side of the first polarizer, and an absorption axis of the absorption polarizer, the reflection axis of the first polarizer, and the reflection axis of the second polarizer are parallel to one another.

3. The liquid crystal display device according to claim 2, wherein a transmittance of a structure including the absorption polarizer, the first polarizer, the retardation layer, and the second polarizer at a polar angle of 60° is 60% or less at each of three azimuths of an azimuth of 0°, an azimuth of 45°, and an azimuth of 90°, where a front transmittance is 100%.

4. The liquid crystal display device according to claim 1, wherein an angle formed by a slow axis of the retardation layer and the reflection axis of the first polarizer is 30° or more and 60° or less.

5. The liquid crystal display device according to claim 1, wherein the retardation layer includes two layers of a first retardation layer and a second retardation layer,
each of the first retardation layer and the second retardation layer is a biaxial retardation layer including an in-plane phase difference R0 and a thickness direction phase difference Rth,
the first retardation layer is disposed closer to the first polarizer,
a slow axis of the first retardation layer is 30° or more and 60° or less with respect to the reflection axis of the first polarizer, and
a slow axis of the second retardation layer is orthogonal to the slow axis of the first retardation layer.

6. The liquid crystal display device according to claim 5, wherein each of the first retardation layer and the second retardation layer is in any one of modes (1), (2), and (3):
(1) a mode in which an NZ factor is 1.4≤NZ<1.6 and an absolute value |R0| of an in-plane phase difference R0 satisfies the following inequalities (1-1) and (1-2):

$$|R0| \geq -325 \times NZ + 710 \quad (1\text{-}1)$$

$$|R0| \leq 225 \times NZ - 50 \quad (1\text{-}2),$$

(2) a mode in which the NZ factor is 1.6≤NZ<3.0 and the absolute value |R0| of the in-plane phase difference R0 satisfies the following inequalities (2-1) and (2-2):

$$|R0| \geq -57 \times NZ + 281 \quad (2\text{-}1)$$

$$|R0| \leq -114 \times NZ + 493 \quad (2\text{-}2), \text{ and}$$

(3) a mode in which the NZ factor is 3.0≤NZ≤4.0 and the absolute value |R0| of the in-plane phase difference R0 satisfies the following inequalities (3-1) and (3-2):

$$|R0| \geq -10 \times NZ + 140 \quad (3\text{-}1)$$

$$|R0| \leq -40 \times NZ + 270 \quad (3\text{-}2).$$

7. The liquid crystal display device according to claim 1, further comprising an absorption polarizer on the viewing surface side of the liquid crystal panel.

8. The liquid crystal display device according to claim 1, wherein the liquid crystal display device is a head-mounted liquid crystal display device.

* * * * *